United States Patent
Wan et al.

(10) Patent No.: US 11,770,542 B2
(45) Date of Patent: *Sep. 26, 2023

(54) COLOUR COMPONENT PREDICTION METHOD, ENCODER, AND DECODER

(71) Applicant: GUANGDONG OPPO MOBILE TELECOMMUNICATIONS CORP., LTD., Guangdong (CN)

(72) Inventors: Shuai Wan, Dongguan (CN); Yanzhuo Ma, Dongguan (CN); Junyan Huo, Dongguan (CN); Haixin Wang, Dongguan (CN); Fuzheng Yang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,679

(22) Filed: Sep. 12, 2022

(65) Prior Publication Data
US 2023/0007279 A1    Jan. 5, 2023

Related U.S. Application Data

(63) Continuation of application No. 17/454,612, filed on Nov. 11, 2021, now Pat. No. 11,477,465, which is a
(Continued)

(51) Int. Cl.
*H04N 19/186* (2014.01)
*H04N 19/105* (2014.01)
(Continued)

(52) U.S. Cl.
CPC ......... *H04N 19/186* (2014.11); *H04N 19/105* (2014.11); *H04N 19/132* (2014.11);
(Continued)

(58) Field of Classification Search
CPC .. H04N 19/105; H04N 19/132; H04N 19/186; H04N 19/593; H04N 19/70; H04N 19/80
See application file for complete search history.

(56) References Cited

U.S. PATENT DOCUMENTS

| | | | |
|---|---|---|---|
| 11,477,465 B2 * | 10/2022 | Wan | H04N 19/147 |
| 2013/0114695 A1 * | 5/2013 | Joshi | H04N 19/463 |
| | | | 375/240.03 |

(Continued)

FOREIGN PATENT DOCUMENTS

| | | |
|---|---|---|
| CA | 3048115 A1 | 7/2018 |
| CN | 106254883 A | 12/2016 |

(Continued)

OTHER PUBLICATIONS

"Enhanced Cross-Component Linear Model for Chroma Intra-Prediction in Video Coding"—Kai Zhang, Jianle Chen, Li Zhang, Xiang Li, and Marta Karczewicz; IEEE Transactions on Image Processing, vol. 27, No. 8, Aug. 2018 (Year: 2018).*

(Continued)

*Primary Examiner* — Mainul Hasan
(74) *Attorney, Agent, or Firm* — PERKINS COIE LLP

(57) ABSTRACT

A method for colour component prediction, applied to an encoder and includes: determining a neighbouring reference sample set of a current block, wherein the neighbouring reference sample set comprises at least one reference sample; determining a preset parameter value corresponding to the current block, including: determining a bitdepth value corresponding to a to-be-predicted colour component of the current block; and performing a shift on 1 by the bitdepth value minus 1 to obtain the preset parameter value. The method further includes: determining an input sample matrix by means of a first preset calculation model based on the neighbouring reference sample set and the preset parameter value; and performing colour component prediction on the (Continued)

current block according to the input sample matrix to obtain a prediction block of the current block.

24 Claims, 11 Drawing Sheets

Related U.S. Application Data continuation of application No. PCT/CN2019/126710, filed on Dec. 19, 2019.

(51) Int. Cl.
    *H04N 19/132*     (2014.01)
    *H04N 19/147*     (2014.01)
    *H04N 19/176*     (2014.01)
    *H04N 19/593*     (2014.01)
    *H04N 19/70*     (2014.01)
    *H04N 19/80*     (2014.01)

(52) U.S. Cl.
    CPC ......... *H04N 19/147* (2014.11); *H04N 19/176* (2014.11); *H04N 19/593* (2014.11); *H04N 19/70* (2014.11); *H04N 19/80* (2014.11)

(56) References Cited

U.S. PATENT DOCUMENTS

| | | |
|---|---|---|
| 2015/0078441 A1 | 3/2015 | Han et al. |
| 2016/0021379 A1 | 1/2016 | Minezawa et al. |
| 2016/0088302 A1* | 3/2016 | Zheng .................. H04N 19/46 375/240.03 |
| 2019/0306498 A1 | 10/2019 | Zhao et al. |
| 2019/0364273 A1 | 11/2019 | Zhao et al. |
| 2020/0344468 A1* | 10/2020 | Lin ...................... H04N 19/105 |
| 2020/0359050 A1 | 11/2020 | Van Der Auwera et al. |
| 2021/0321090 A1 | 10/2021 | Deng et al. |

FOREIGN PATENT DOCUMENTS

| | | | |
|---|---|---|---|
| CN | 106663209 A | 5/2017 | |
| CN | 110024405 A | 7/2019 | |
| CN | 110463201 A | 11/2019 | |
| WO | 2019077197 A1 | 4/2019 | |
| WO | 2020239017 A1 | 12/2020 | |
| WO | 2020239018 A1 | 12/2020 | |
| WO | WO-2020239017 A1 * | 12/2020 | ........... H04N 19/593 |
| WO | WO-2020239018 A1 * | 12/2020 | ............. G06F 17/16 |

OTHER PUBLICATIONS

"Multi-model Based Cross-component Linear Model Chroma Intra-prediction for Video Coding"—Kai Zhang, Jianle Chen, Li Zhang, Xiang Li, Marta Karczewicz; 2017 IEEE Visual Communications and Image Processing (VCIP); Dec. 10-13, 2017. (Year: 2017).*
Helle (Fraunhofer) P et al: "Variations of the 8-bit implementation of MIP" 127. Mpeg Meeting; Jul. 8-Jul. 12, 2019; Gothenburg; (Motion Picture Expert Groupor ISO/IEC JTC1/SC29/WG11), No. m48606 Jul. 7, 2019 (Jul. 7, 2019), XP030222145, Retrieved from the Internet:URL:http://phenix.int-evry.fr/mpeg/doc_end_user/documents/127_Gothenburg/wg11/m48606-JVET-O0481-v2-JVET-O0481-v2.zip JVET-O0481-v2/JVET-O0481-v2.docx [retrieved on Jul. 7, 2019] *the whole document*.
Biatek (Qualcomm) T et al: "Non-CE3: Simplified MIP with reduced memory footprint", 16. JVET Meeting; Oct. 1-Oct. 11, 2019; Geneva; (The Joint Video Exploration Team of ISO/IEC JTC1/SC29/WG11 and ITU-T SG. 16), No. JVET-P0194 ; m50156 Oct. 6, 2019 (Oct. 6, 2019), XP030216568, Retrieved from the Internet: URL:http://phenix. int-evry.fr/jvet/doc_end_user/documents/16_Geneva/wg11/JVET-P0194-v3. zip JVET-P0194-v3.docx [retrieved on Oct. 6, 2019] *the whole document*.
Nishi (Panasonic) T et al: "AHG9: Unified signalling of PTL and HRD parameters in VPS", 17. JVET Meeting; Jan. 7-Jan. 17, 2020; Brussels; (The Joint Video Exploration Team of ISO/IEC JTC1/SC29/WG11 and ITU-TSG.16), No. JVET-Q0047 ; m51619 Dec. 18, 2019 (Dec. 18, 2019), XP030222423, Retrieved from the Internet:URL: http://phenix. int-evry.fr/jvet/doc_end_user/documents/17_Brussels/wg11/JVET-Q0047-v1.zip JVET-Q0047_based_on_JVET-P2001-vE.docx [retrieved on Dec. 18, 2019] *clauses 7.3 9.5, 7.4.10.5 and 8.4.5.2.1*.
English translation of the Written Opinion of the International Search Authority in the international application No. PCT /CN2019/126710, dated Sep. 2, 2020.
Non-Final Office Action of the U.S. Appl. No. 17/454,612, dated Feb. 1, 2022.
Notice of Allowance of the U.S. Appl. No. 17/454,612, dated Jun. 15, 2022.
Supplementary European Search Report in the European application No. 19956859.3, dated Aug. 19, 2022.
Benjamin Brass et al : "Versatile Video Coding (Draft 7)" JVET-P2001-vE, Joint Video Experts Team (JVET) of ITU-T SG 16 WP 3 and ISO/IEC JTC 1/SC 29/WG 11 16th Meeting: Geneva, CH, Oct. 1-11, 2019.
Office Action of the Indian application No. 202117051192, dated Sep. 13, 2022. 7 pages with English translation.
Liu Hua-Bei et al., "Intra Prediction in AVS Video Encoding", <Computer System Application>, vol. 24, Issue 1, 2015. 10 pages.
First Office Action of the Chinese application No. 202111290248.2, dated Nov. 18, 2022. 12 pages with English translation.
Pfaff. Jonathan et al. "CE3: Affine linear weighted intra prediction (CE3-4.I. CE3-4.2)" Joint Video Experts Team (JVET) of ITU-T SG 16 WP 3 and ISO/IEC JTC I/SC 29/WG 11 14th Meeting: Geneva,CH, Mar. 19-27, 2019 Document:JVET-N0217,Mar. 27, 2019 (Mar. 27, 2019),part 1, sections 1.1-1.4.
Pfaff, Jonathan et al. "CE3: Affine linear weighted intra prediction (test 1.2.1, test 1.2.2)"Joint Video Experts Team (JVET) of ITU-T SG 16 WP 3 and ISO/IEC JTC I/SC 29/WG 11 13th Meeting: Marrakech,MA, Jan. 9-18, 2019 Document: JVET-M0043,Jan. 18, 2019 (Jan. 18, 2019),entire document.
Wang,B. et al. Non-CE3: Simplifications of Intra Mode Coding for Matrix-based Intra Prediction Joint Video Experts Team (JVET) of ITU-T SG 16 WP 3 and ISO/IEC JTC I/SC 29/WG 11 15th Meeting: Gothenburg, SE, Jul. 3-12, 2019 Document:JVET-00170-vl,Jul. 12, 2019 (Jul. 12, 2019),entire document.
Chen,Jianle et al. "Algorithm description for Versatile Video Coding and Test Model 5(VTM 5)" Joint Video Experts Team (JV T) of ITU-T SG 16 WP 3 and ISO/IEC JTC I/SC 29/WG 11 14th Meeting: Geneva, CH, 19 Mar. 27, 2019 Document: JVET-NI002-v2,Mar. 27, 2019 (Mar. 27, 2019),entire document.
Geert, Van der Auwera et al. "Description of Core Experiment 3 (CE3): Intra Prediction and Mode Coding" Joint Video Experts Team (JVET) of/TU-T SG 16 WP 3 and ISO/IEC JTC I/SC 29/WG 11 15th Meeting: Gothenburg, SE, Jul. 3-12, 2019 Document: JVET-02023-v3,Jul. 12, 2019 (Jul. 12, 2019),entire document.
International Search Report in the international application No. PCT /CN2019/126710, dated Sep. 2, 2020.
Notice of Allowance of the Chinese application No. 202111290248. 2, dated Mar. 26, 2023. 5 pages with English translation.
First Office Action of the European application No. 19956859.3, dated May 23, 2023. 6 pages.

* cited by examiner

US 11,770,542 B2

COLOUR COMPONENT PREDICTION METHOD, ENCODER, AND DECODER

CROSS REFERENCE TO RELATED APPLICATIONS

This is a continuation of U.S. application Ser. No. 17/454,612, filed on Nov. 11, 2021 and entitled "COLOUR COMPONENT PREDICTION METHOD, ENCODER, DECODER, AND STORAGE MEDIUM", which is a continuation of International Application No. PCT/CN2019/126710, filed on Dec. 19, 2019, and entitled "IMAGE COMPONENT PREDICTION METHOD, ENCODER, DECODER, AND STORAGE MEDIUM", the disclosure of the applications is hereby incorporated by reference in their entireties.

TECHNICAL FIELD

Embodiments of the present disclosure relate to the technical field of picture processing, and particularly to a method for colour component prediction, an encoder, a decoder, and a storage medium.

BACKGROUND

As people's requirements for video display quality increase, new video applications such as high-definition and ultra-high-definition video have emerged. H.265/High Efficiency Video Coding (HEVC) has been unable to meet the needs of rapid development of the video applications. The Joint Video Exploration Team (JVET) proposed a next-generation video coding standard H.266 or Versatile Video Coding (VVC), and its corresponding test model is a VVC reference software test platform, i.e., a VVC Test Model (VTM).

In the H.266/VVC, a Matrix-based Intra Prediction (MIP) technology has been accepted at present. According to the technology, for the difference in types of intra luma blocks, different numbers of MIP modes are added in an intra luma prediction process. In an MIP process, a derivation process is also related to the types of luma blocks, which makes the derivation process relatively complicated, is not conducive to parallel processing, and on the contrary, increases the complexity.

DETAILED DESCRIPTION

Figure 1:
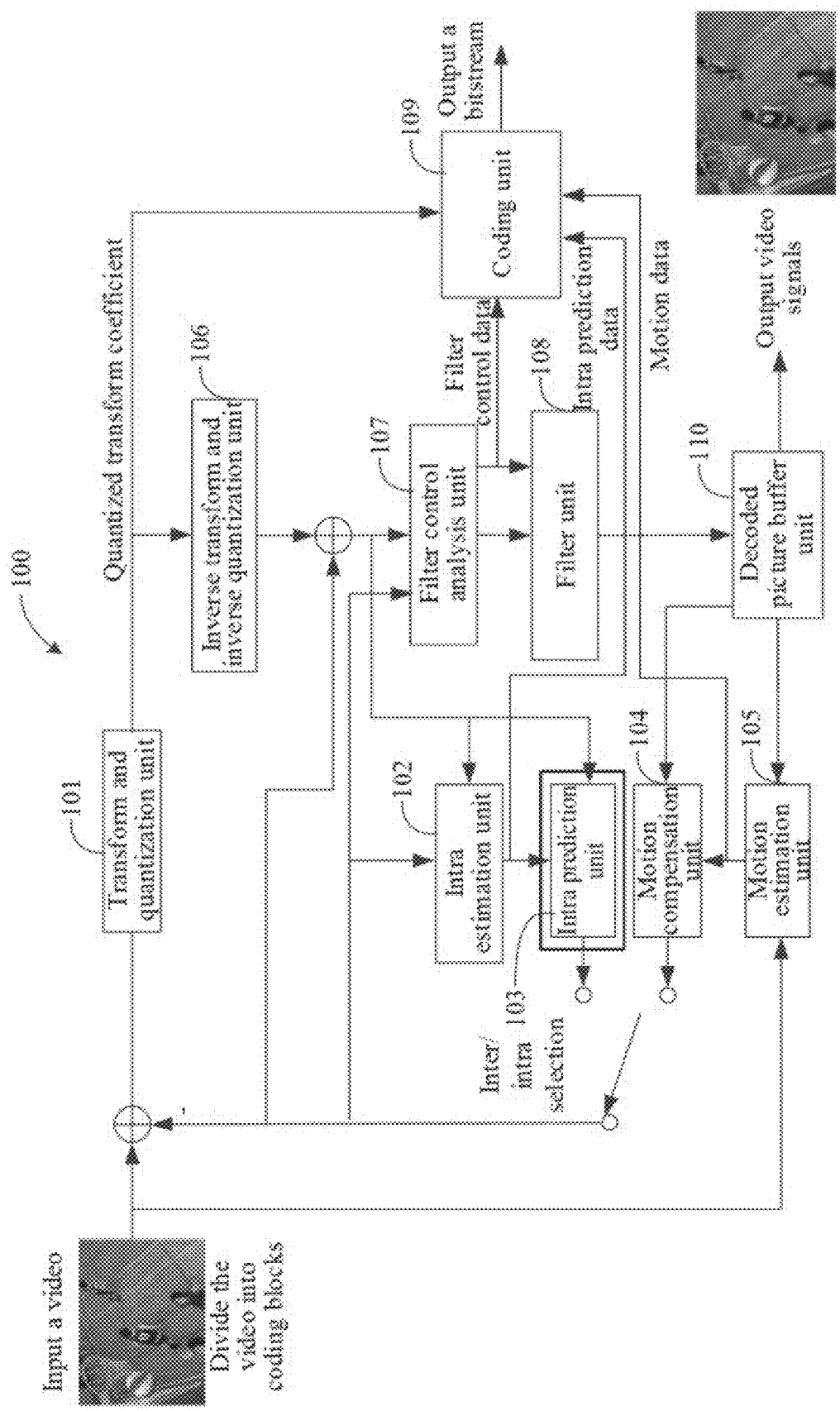
FIG. 1 is a composition block diagram of a video coding system according to an embodiment of the present disclosure.

In order to make the characteristics and technical contents of the embodiments of the present disclosure understood in more detail, implementation of the embodiments of the present disclosure will be described below in combination with the drawings in detail. The appended drawings are only adopted for description as references and not intended to limit the embodiments of the present disclosure.

In a video picture, a first colour component, a second colour component, and a third colour component are usually adopted to represent a Coding Block (CB). The three colour components are a luma component, a blue chroma component, and a red chroma component respectively. Specifically, the luma component is usually represented by sign Y, the blue chroma component is usually represented by sign Cb or U, and the red chroma component is usually represented by sign Cr or V. Therefore, the video picture may be represented in a YCbCr format, or may be represented in a YUV format.

In the embodiments of the present disclosure, the first colour component may be the luma component, the second colour component may be the blue chroma component, and the third colour component may be the red chroma component. However, no specific limits are made in the embodiments of the present disclosure.

In the MIP technology, input data predicted by MIP may include a reference sample in a previous line and in a left column of a current block, an MIP mode (which may be represented as modeId) applied to the current block, information of a width and a height of the current block, and whether it needs to be transposed, and the like; output data predicted by MIP may include a predicted value of the current block. The MIP process may specifically include four steps: configuring an MIP core parameter, acquiring a reference sample, constructing input samples, and generating a predicted value. After the four steps, the predicted value of the current block may be obtained.

However in the MIP process, for the step of constructing an input sample, since the step needs to have a strong correlation with the type of luma blocks (which may be represented by mipSizeId), that is, for different types of luma blocks, different input sample derivation methods will be adopted to obtain an input sample matrix, making the derivation process complicated, especially for the case where the type of luma blocks (mipSizeId) is equal to 0 or 1, the derivation methods of p[0] and p[x] in the input sample matrix are different, which is not conducive to parallel processing. In addition, for the difference of the types of luma blocks, different numbers of MIP modes are added in the intra luma prediction process, determination of the type of luma blocks needs to be performed when luma prediction is performed for each MIP mode, and the complexity is also increased.

The embodiments of the present disclosure provide a method for colour component prediction. A neighbouring reference sample set of a current block is determined, and a preset parameter value corresponding to the current block is determined, the neighbouring reference sample set including at least one reference sample; the neighbouring reference sample set and the preset parameter value are buffered to construct an input reference sample set; an input sample matrix is determined by means of a first preset calculation model based on the input reference sample set; and colour component prediction is performed on the current block according to the input sample matrix to obtain a prediction block of the current block. Thus, in the solutions of the embodiments of the present disclosure, judgment of the type of current block is omitted, which reduces the time complexity, and facilitates hardware implementation, in addition, the input sample matrix may be determined based on the input reference sample set and the first preset calculation model, while the derivation process of the input samples for matrix multiplication is also simplified, so that the derivation process of the input sample matrix is unified, and the solutions of the embodiments of the present disclosure no longer depend on the type of the current block and can also realize parallel processing, thereby reducing the calculation complexity.

Embodiments of the present disclosure provide a method for colour component prediction, an encoder, a decoder, and a storage medium, which may simplify the derivation process of input samples for matrix multiplication, and further can reduce the time complexity.

The technical solutions of the embodiments of the present disclosure may be implemented as follows.

According to a first aspect, the embodiments of the present disclosure provide a method for colour component prediction, which may be applied to an encoder and include the following operations.

A neighbouring reference sample set of a current block is determined, and a preset parameter value corresponding to the current block is determined, the neighbouring reference sample set including at least one reference sample.

The neighbouring reference sample set and the preset parameter value are buffered to construct an input reference sample set.

An input sample matrix is determined by means of a first preset calculation model based on the input reference sample set.

Colour component prediction is performed on the current block according to the input sample matrix to obtain a prediction block of the current block.

According to a second aspect, the embodiments of the present disclosure provide a method for colour component prediction, which may be applied to a decoder and include the following operations.

A neighbouring reference sample set of a current block is determined, and a preset parameter value corresponding to the current block is determined, the neighbouring reference sample set including at least one reference sample.

The neighbouring reference sample set and the preset parameter value are buffered to construct an input reference sample set.

An input sample matrix is determined by means of a first preset calculation model based on the input reference sample set.

Colour component prediction is performed on the current block according to the input sample matrix to obtain a prediction block of the current block.

According to a third aspect, the embodiments of the present disclosure provide an encoder, which may include a first determination unit, a first buffer unit, and a first prediction unit.

The first determination unit is configured to determine a neighbouring reference sample set of a current block, and determine a preset parameter value corresponding to the current block, the neighbouring reference sample set including at least one reference sample.

The first buffer unit is configured to buffer the neighbouring reference sample set and the preset parameter value to construct an input reference sample set.

The first determination unit is further configured to determine an input sample matrix by means of a first preset calculation model based on the input reference sample set.

The first prediction unit is configured to perform colour component prediction on the current block according to the input sample matrix to obtain a prediction block of the current block.

According to a fourth aspect, the embodiments of the present disclosure provide an encoder, which may include a first memory and a first processor.

The first memory may be configured to store a computer program capable of running in the first processor.

The first processor may be configured to run the computer program to execute the method as described in the first aspect.

According to a fifth aspect, the embodiments of the present disclosure provide a decoder, which may include a second determination unit, a second buffer unit, and a second prediction unit.

The second determination unit is configured to determine a neighbouring reference sample set of a current block, and determine a preset parameter value corresponding to the current block, the neighbouring reference sample set including at least one reference sample.

The second buffer unit is configured to buffer the neighbouring reference sample set and the preset parameter value to construct an input reference sample set.

The second determination unit is further configured to determine an input sample matrix by means of a first preset calculation model based on the input reference sample set.

The second prediction unit is configured to perform colour component prediction on the current block according to the input sample matrix to obtain a prediction block of the current block.

According to a sixth aspect, the embodiments of the present disclosure provide a decoder, which may include a second memory and a second processor.

The second memory may be configured to store a computer program capable of running in the second processor.

The second processor may be configured to run the computer program to execute the method as described in the second aspect.

According to a seventh aspect, the embodiments of the present disclosure provide a computer storage medium, which may store a colour component prediction program. The colour component prediction program may be executed by a first processor to implement the method as described in the first aspect, or by a second processor to implement the method as described in the second aspect.

The embodiments of the present disclosure provide a method for colour component prediction, an encoder, a decoder, and a storage medium. A neighbouring reference sample set of a current block is determined, and a preset parameter value corresponding to the current block is determined; the neighbouring reference sample set and the preset parameter value are buffered to construct an input reference sample set; an input sample matrix is determined by means of a first preset calculation model according to the reference sample set; and colour component prediction is performed on the current block according to the input sample matrix to obtain a prediction block of the current block. Thus, in the solutions of the embodiments of the present disclosure, judgment of the type of current block is omitted, the time complexity is reduced, and hardware implementation is facilitated. In addition, the input sample matrix may be determined based on the input reference sample set and the first preset calculation model, while the derivation process of the input samples for matrix multiplication is also simplified, so that the derivation process of the input sample matrix is unified, and the solutions of the embodiments of the present disclosure no longer depend on the type of current block and can realize parallel processing, thereby reducing the calculation complexity.

Each embodiment of the present disclosure will be described below in combination with the drawings in detail.

FIG. 1 is a composition block diagram of a video coding system according to an embodiment of the present disclosure. As shown in FIG. 1, the video coding system 100 includes a transform and quantization unit 101, an intra estimation unit 102, an intra prediction unit 103, a motion compensation unit 104, a motion estimation unit 105, an inverse transform and inverse quantization unit 106, a filter control analysis unit 107, a filter unit 108, a coding unit 109, a decoded picture buffer unit 110, etc. The filter unit 108 may implement deblocking filtering and Sample Adaptive Offset (SAO) filtering. The coding unit 109 may implement header information coding and Context-based Adaptive Binary Arithmetic Coding (CABAC). For an input original video signal, a video coding block may be obtained by division of a Coding Tree Unit (CTU), and then residual sample information obtained by intra or inter prediction is processed through the transform and quantization unit 101 to transform the video coding block, including transforming the residual information from a sample domain to a transform domain and quantizing an obtained transform coefficient to further reduce a bit rate. The intra estimation unit 102 and the intra prediction unit 103 are configured to perform intra prediction on the video coding block. Exactly, the intra estimation unit 102 and the intra prediction unit 103 are configured to determine an intra prediction mode to be adopted to code the video coding block. The motion compensation unit 104 and the motion estimation unit 105 are configured to execute intra prediction coding on the received video coding block relative to one or more blocks in one or more reference frames to provide time prediction information. Motion estimation executed by the motion estimation unit 105 is a process of generating a motion vector. A motion of the video coding block may be estimated according to the motion vector, and then the motion compensation unit 104 executes motion compensation based on the motion vector determined by the motion estimation unit 105. After the intra prediction mode is determined, the intra prediction unit 103 is further configured to provide selected intra predicted data to the coding unit 109, and the motion estimation unit 105 also sends calculated motion vector data to the coding unit 109. In addition, the inverse transform and inverse quantization unit 106 is configured to reconstruct the video coding block, namely a residual block is reconstructed in the sample domain, an artifact with a blocking effect in the reconstructed residual block is removed through the filter control analysis unit 107 and the filter unit 108, and then the reconstructed residual block is added to a predictive block in a frame of the decoded picture buffer unit 110 to generate a reconstructed video coding block. The coding unit 109 is configured to code various coding parameters and quantized transform coefficients. In a CABAC-based coding algorithm, a context may be based on neighbouring coding blocks and configured to code information indicating the determined intra prediction mode to output a bitstream of the video signal. The decoded picture buffer unit 110 is configured to store the reconstructed video coding block as a prediction reference. As video pictures are coded, new reconstructed video coding blocks may be continuously generated, and all these reconstructed video coding blocks may be stored in the decoded picture buffer unit 110.

Figure 2:
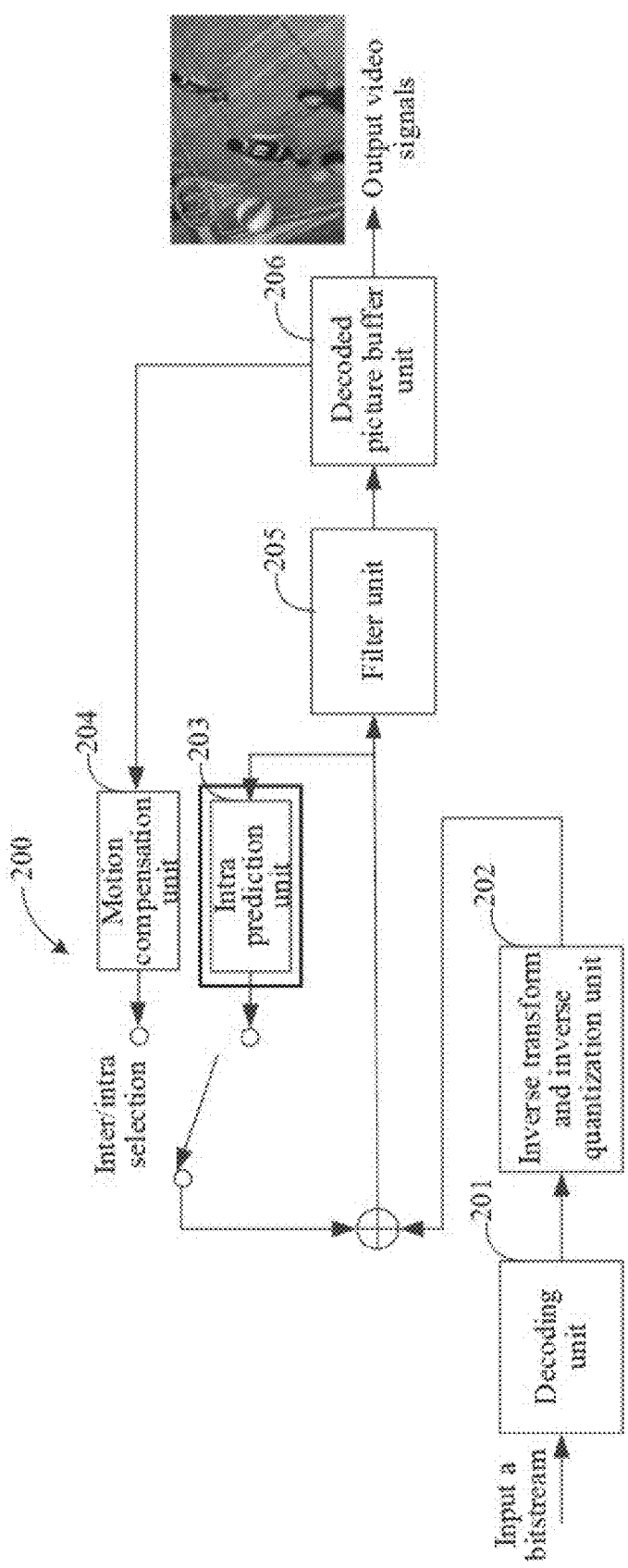
FIG. 2 is a composition block diagram of a video decoding system according to an embodiment of the present disclosure.

FIG. 2 is a composition structure diagram of a video decoding system according to an embodiment of the present disclosure. As shown in FIG. 2, the video decoding system 200 includes a decoding unit 201, an inverse transform and inverse quantization unit 202, an intra prediction unit 203, a motion compensation unit 204, a filter unit 205, a decoded picture buffer unit 206, etc. The decoding unit 201 may implement header information decoding and CABAC decoding. The filter unit 205 may implement deblocking filtering and SAO filtering. After coding processing shown in FIG. 1 is performed on an input video signal, a bitstream of the video signal is output. The bitstream is input to the video decoding system 200, and passes through the decoding unit 201 at first to obtain a decoded transform coefficient. A residual block is generated in a sample domain by processing of the inverse transform and inverse quantization unit 202 for the transform coefficient. The intra prediction unit 203 may be configured to generate predicted data of a current video decoding block based on a determined intra prediction mode and data of a previous decoded block from a present frame or picture. The motion compensation unit 204 is configured to analyze a motion vector and another associated syntactic element to determine prediction information for the video decoding block and generate a predictive block of the video decoding block that is currently decoded by use of the prediction information. The residual block from the inverse transform and inverse quantization unit 202 and the corresponding predictive block generated by the intra prediction unit 203 or the motion compensation unit 204 are summed to form a decoded video block. An artifact with a blocking effect in the decoded video signal may be removed through the filter unit 205 to improve the video quality. Then, the decoded video block is stored in the decoded picture buffer unit 206. The decoded picture buffer unit 206 is configured to store a reference picture for subsequent intra prediction or motion compensation, and is further configured to output a video signal, thus, the recovered original video signal is obtained.

The method for colour component prediction in the embodiment of the present disclosure is mainly applied to the intra prediction unit 103 shown in FIG. 1 and the intra prediction unit 203 shown in FIG. 2. That is, the method for colour component prediction of the embodiments of the present disclosure may be applied to not only a video coding system but also a video decoding system, and may even be applied to the video coding system and the video decoding system at the same time. No specific limits are made in the embodiments of the present disclosure. It is also to be noted that, when the method for colour component prediction is applied to the intra prediction unit 103, the "current block" specifically refers to a current CB in intra prediction, and when the method for colour component prediction is applied to the intra prediction unit 203, the "current block" specifically refers to a current decoding block in intra prediction.

Figure 3:
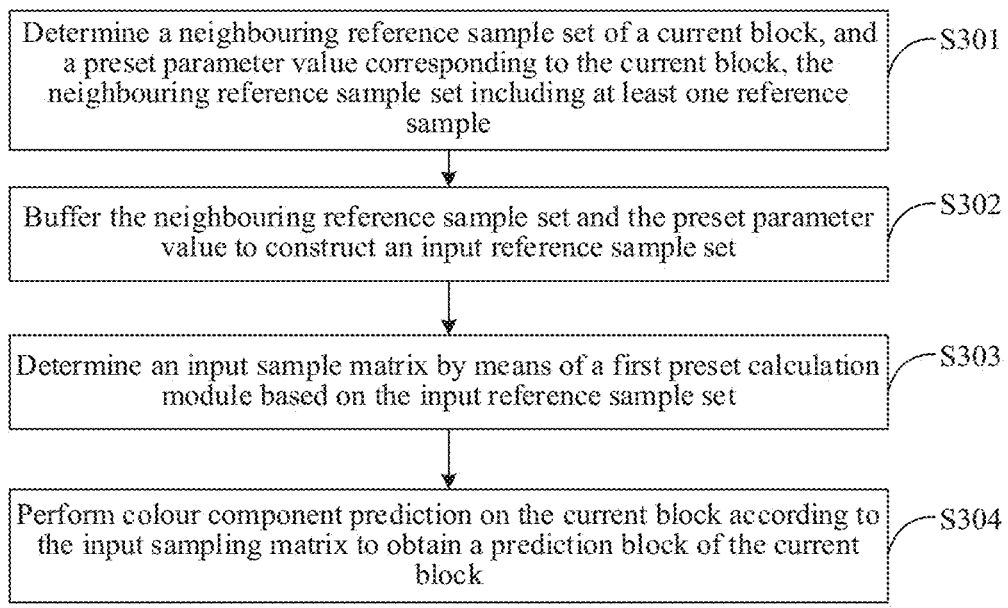
FIG. 3 is a flowchart of a method for colour component prediction according to an embodiment of the present disclosure.

Based on the application scenario example in FIG. 1 or FIG. 2 above, referring to FIG. 3, a flowchart of a method for colour component prediction according to an embodiment of the present disclosure is shown. As shown in FIG. 3, the method may include the following operations.

In S301, a neighbouring reference sample set of a current block is determined, and a preset parameter value corresponding to the current block is determined, the neighbouring reference sample set including at least one reference sample.

It is to be noted that a video picture may be divided into multiple picture blocks, and each current to-be-coded picture block may be called a coding block. Here, each coding block may include a first colour component, a second colour component, and a third colour component. The current block is a coding block of which the first colour component, the second colour component, or the third colour component is currently to be predicted in the video picture.

Assuming that the current block performs first colour component prediction, and a first colour component is a luma component, that is, a to-be-predicted colour component is the luma component, then the current block may also be called a luma block; or assuming that the current block performs second colour component prediction, and the second colour component is a chroma component, that is, a to-be-predicted colour component is the chroma component, then the current block may also be called a chroma block.

It is also to be noted that for the current block, when a left neighbouring region, a bottom-left neighbouring region, a top neighbouring region, and a top-right neighbouring region are all effective regions, the neighbouring reference sample set may be obtained by filtering reference samples in the left neighbouring region and the top neighbouring region of the current block, may be obtained by filtering reference samples in left neighbouring region and the bottom-left neighbouring region of the current block, and may also be obtained by filtering reference samples in the top neighbouring region and the right neighbouring region of the current block, which is not specifically limited in the embodiment of the present disclosure.

In some embodiments, for S301, the operation that a neighbouring reference sample set of a current block is determined may include the following operations.

A reference sample neighbouring to at least one side of the current block is acquired, the at least one side of the current block including at least one of a top side, a top-right side, a left side, or a bottom-left side.

The neighbouring reference sample set of the current block is determined according to the acquired reference sample.

Here, the at least one side of the current block may be the top side (also referred to as a top line), may also be the top-right side (also referred to as a top-right line), or the left side (also referred to as a left column), or the bottom-left side (also referred to as a bottom-left column), and even may be a combination of two sides, such as the top side and the left side, which is not limited in the embodiment of the present disclosure.

Further, in some embodiments, if the at least one side of the current block is the left side and/or the top side, for S301, the operation that a neighbouring reference sample set of a current block is determined may include the following operations.

The reference sample neighbouring to the at least one side of the current block is acquired, the at least one side including the top side and/or the left side.

The neighbouring reference sample set of the current block is determined according to the acquired reference sample.

Here, the at least one side of the current block may include the left side of the current block and/or the top side of the current block, namely the at least one side of the current block may refer to the top side of the current block, or may refer to the left side of the current block, or may even refer to the top side and left side of the current block. No specific limits are made in the embodiment of the present disclosure.

Further, in some embodiments, for S301, the operation that a neighbouring reference sample set of a current block is determined may include the following operations.

First filtering processing is performed on the reference sample neighbouring to the at least one side of the current block to determine a reference sample neighbouring to the at least one side.

The neighbouring reference sample set of the current block is formed according to the acquired reference sample.

Furthermore, in some embodiments, the method may further include the following operation.

The first filtering processing includes down-sampling filtering or low-pass filtering.

It is to be noted that, when both a left-side neighbouring region and a top-side neighbouring region are effective regions, the neighbouring reference sample set may be obtained by filtering a reference sample neighbouring to the left side of the current block and a reference sample neighbouring to the top side of the current block. When the left-side neighbouring region is an effective region, and the top-side neighbouring region is an ineffective region, the neighbouring reference sample set may be obtained by filtering a reference sample neighbouring to the left side of the current block. When the left-side neighbouring region is an ineffective region, and the top-side neighbouring region is an effective region, the neighbouring reference sample set may be obtained by filtering a reference sample neighbouring to the top side of the current block. The filtering may refer to down-sampling filtering, or may refer to low-pass filtering, which is not specifically limited in the embodiment of the present disclosure.

Figure 4A:
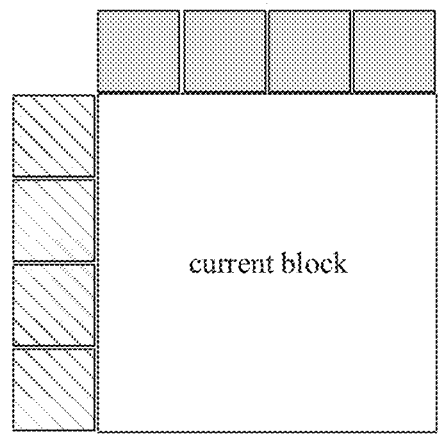
FIG. 4A is a structure diagram of positions of reference samples according to an embodiment of the present disclosure.

In practical applications, during prediction of the current block, a top block and a left block of the current block are already coded; a reference sample of the MIP technology may be a reconstructed values of a reference sample in the previous line, neighbouring to the current block and a reconstructed value of a reference sample in the left column, neighbouring to the current block, the reference sample of the current block may be obtained from reference samples respectively corresponding to the top side and the left side of the current block. In FIG. 4A, a diagram of positions of reference samples according to an embodiment of the present disclosure is shown. In FIG. 4A, when both the left-side neighbouring region and the top-side neighbouring region are effective regions, the reference samples corresponding to the top side of the current block are samples filled with gray, which may be represented by refT. The reference samples corresponding to the left side of the current block are samples filled with slashes, which may be represented by refL. Thus, the reference samples of the current block may include refT and refL, and the neighbouring reference sample set is obtained by filtering refT and refL It is important to note that ineffective positions (e.g., boundaries of a picture) may be filled by the same method as that of acquiring reference samples in the traditional intra prediction technology.

For the MIP technology, the current block may be classified into three types according to the size, which may be recorded with mipSizeId. Specifically, a different type of the current block correspond to a different number of sample points included in a neighbouring reference sample set and a different number of matrix multiplication output sample points.

Assuming that the current block is a 4×4 picture block, mipSizeId=0, then its input reference sample set involves two samples selected for each side, the number of matrix multiplication input sample points is four, and a 4×4 MIP block is output.

Assuming that the current block is a 4×N, N×4, or 8×8 picture block (where N=8, 16, 32, and 64), mipSizeId=1, then its input reference sample set involves four samples selected for each side, the number of matrix multiplication input sample points is eight, and a 4×4 MIP block is output.

Assuming that the current block is a picture block of other size, mipSizeId=2, then its input reference sample set involves fourth samples selected for each side, the number of matrix multiplication input sample points is seven, and an 8×8 MIP block is output.

Thus, since the sum of the width and height of the current block is greater than the number of matrix multiplication input sample points, in order to obtain a sample of the number of the input sample points, down-sampling processing on the obtained reference samples (including refT and refL) is required, to obtain the neighbouring reference sample set.

Further, in some embodiments, the operation that the neighbouring reference sample set of the current block is determined according to the acquired reference sample may include the following operations.

Sampling positions of the reference samples are determined based on the at least one side of the current block.

Reference samples corresponding to the sampling positions are selected from the acquired reference samples, the selected parameter samples form the neighbouring reference sample set.

Furthermore, the operation that sampling positions of the reference samples are determined based on the at least one side of the current block may include the following operation.

Down-sampling processing is performed on the at least one side of the current block to determine the sampling positions.

It is to be noted that reference samples in the number of the boundarySize need to be respectively sampled on each reference side (including the top side and the left side) of the current block, and a value of boundarySize is related to mipSizeId of the current block.

Specifically, for reference samples refS, the number (i.e., a length of a side of the current block) is nTbS, the number of reference samples that need to be down-sampled here is boundarySize. A sampling rate of each reference side may be represented by bDwn, which may be calculated according to formula (A). In addition, among the reference samples refS, every bDwn reference samples are subjected to an average operation. Each obtained average value serves as a sample point of the reference samples redS which may be calculated according to formula (2). Here, S may be substituted with W and H respectively, where W represents the top side, and H represents the left side.

$$bDwn = nTbs/boundarySize \quad (1)$$

$$redS[x] = (\Sigma_{i=0}^{bDwn-1} refS[x \times bDwn + i] + (1 << (\text{Log } 2(bDwn)-1))) >> \text{Log } 2(bDwn) \quad (2)$$

Figure 4B:
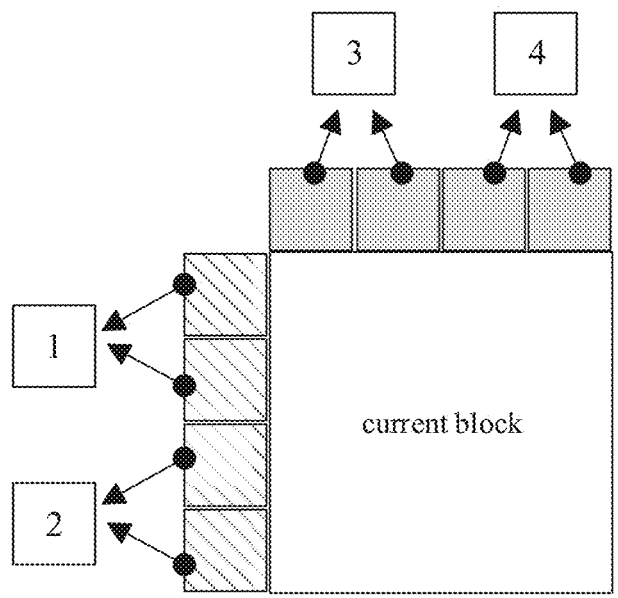
FIG. 4B is a structure diagram of down-sampling processing of reference samples according to an embodiment of the present disclosure.

After the down-sampling processing according to formula (1) and formula (2), two parts of reference samples may be obtained: top-side reference samples redT obtained by down-sampling top-side reference samples refT of the current block, and left-side reference samples redL obtained by down-sampling left-side reference samples refL of the current block, as shown in FIG. 4B. In FIG. 4B, taking a 4×4 current block as an example, the redL obtained by down-sampling the left side includes two reference samples, namely a reference sample 1 and a reference sample 2; the redT obtained by down-sampling the top side includes two reference samples, namely a reference sample 3 and a reference sample 4. Thus, the neighbouring reference sample set of the current block includes four reference samples.

For the MIP technology, in addition to obtaining the type mipSizeId of the current block, a bitdepth value (which may be represented by BitDepth) corresponding to a to-be-predicted colour component of the current block is also required. Assuming that the to-be-predicted colour component is a luma component, a luma bitdepth of the current block may be obtained; or, assuming that the to-be-predicted colour component is a chroma component, a chroma bitdepth of the current block may be obtained, so that the preset parameter value of the current block is obtained.

Further, in some embodiments, for S301, the operation that a preset parameter value corresponding to the current block is determined may include the following operations.

A bitdepth value corresponding to a to-be-predicted colour component of the current block is determined.

A shift is performed on 1 by the bitdepth value minus 1 to obtain the preset parameter value.

That is, the preset parameter value may be represented as 1<<(BitDepth−1) after the BitDepth corresponding to the to-be-predicted colour component of the current block is acquired.

Thus, the obtained neighbouring reference sample set and the preset parameter value of the current block may be buffered to construct an input reference sample set.

In S301 the neighbouring reference sample set and the preset parameter value are buffered to construct an input reference sample set.

It is to be rioted that, after the neighbouring reference sample set is obtained, an initial input reference sample set may be constructed first; one bit is added at the end of an initial buffer to buffer the preset parameter value to obtain an input reference sample set, which facilitates the subsequent construction of an input sample matrix.

In some embodiments, for S302, the operation that the neighbouring reference sample set and the preset parameter value are buffered to construct an input reference sample set may include the following operations.

The neighbouring reference sample set is buffered to obtain an initial input reference sample set.

The preset parameter value is buffered by using a data unit after the initial input reference sample set to obtain the input reference sample set.

Further, for the construction of the initial input reference sample set, there is a difference between an encoder side and a decoder side, which is substantially related to a manner of determining a transposition processing indication flag (which may be represented by isTransposed).

When applied to the encoder side, in some embodiments, the operation that the neighbouring reference sample set is buffered to obtain an initial input reference sample set may include the following operations.

A value of a transposition processing indication flag is determined by using a Rate Distortion Optimization (RDO) manner.

When the value of the transposition processing indication flag is equal to 0, a reference sample is stored in a buffer, such that a reference sample corresponding to the top side of the current block in the neighbouring reference sample set is stored ahead of a reference sample corresponding to the left side of the current block in the neighbouring reference sample set, and the buffer is determined as the initial input reference sample set. Or, when the value of the transposition processing indication flag is equal to 1, the reference sample is stored in a buffer, such that the reference sample corresponding to the top side of the current block in the neighbouring reference sample set is stored after the reference sample corresponding to the left side of the current block in the neighbouring reference sample set, transposition processing is performed on the buffer, and the transposed buffer is determined as the initial input reference sample set.

It is to be noted that, the value of the transposition processing indication flag may be determined by RDO. For example, a first cost value when transposition processing is performed and a second cost value when transposition processing is not performed are calculated respectively; if the first cost value is less than the second cost value, it may be determined that the value of the transposition processing indication flag is equal to 1, then reference samples corresponding to the top side in the neighbouring reference sample set may be stored after reference samples corresponding to the left side in the neighbouring reference sample set, or a reference sample corresponding to the left side in the neighbouring reference sample set may be stored ahead of a reference sample corresponding to the top side of the current block in the neighbouring reference sample set, that is, transposition processing is required; if the first cost value is no less than the second cost value, it may be determined that the value of the transposition processing indication flag is equal to 0, then the reference sample corresponding to the top side of the current block in the neighbouring reference sample set may be stored ahead of the reference sample corresponding to the left side of the current block in the neighbouring reference sample set, or the reference sample corresponding to the left side of the current block in the neighbouring reference sample set may be stored after the reference sample corresponding to the top side of the current block in the neighbouring reference sample set, that is, transposition processing is not required.

It is also to be noted that, on the encoder side, the determined value of the transposition processing indication flag needs to be written in a bitstream to facilitate subsequent parsing processing on the decoder side.

When applied to the decoder side, in some embodiments, the operation that the neighbouring reference sample set is buffered to obtain an initial input reference sample set may include the following operations.

A bitstream is parsed to obtain a value of a transposition processing indication flag.

When the value of the transposition processing indication flag is equal to 0, a reference sample is stored in a buffer, such that a reference sample corresponding to the top side of the current block in the neighbouring reference sample set is stored ahead of a reference sample corresponding to the left side of the current block in the neighbouring reference sample set, and the buffer is determined as the initial input reference sample set.

When the value of the transposition processing indication flag is equal to 1, reference samples are stored in a buffer, such that reference samples corresponding to the top side in the neighbouring reference sample set is stored after reference samples corresponding to the left side in the neighbouring reference sample set, transposition processing is performed on the buffer, and the transposed buffer is determined as the initial input reference sample set.

It is to be noted that on the decoder side, the value of the transposition processing indication flag may be directly obtained by parsing the bitstream; then, it is determined whether to perform transposition processing on the buffer according to the value of the transposition processing indication flag.

Figure 5A:
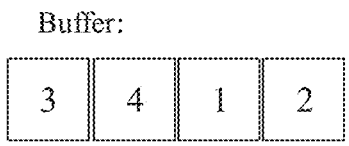
FIG. 5A is a structure diagram of buffer filling according to the related technical solution.

That is, after the value of the transposition processing indication flag (isTransposed) is determined, assuming that the buffer may be represented by pTemp, when isTransposed is 0, all reference samples redT corresponding to the top side are stored in pTemp first, and all reference samples redL corresponding to the left side are stored from a next bit immediately following all stored redT on. As shown in FIG. 5A, still taking a 4×4 current block as an example, redL includes a reference sample 1 and a reference sample 2, and redT includes a reference sample 3 and a reference sample 4; thus, the buffer order in pTemp is the reference sample 3, the reference sample 4, the reference sample 1, and the reference sample 2. Since the reference samples corresponding to the top side of the current block are all stored ahead of the reference samples corresponding to the left side of the current block, transposition is omitted here, and the resulting buffer is the initial input reference sample set.

Figure 5B:
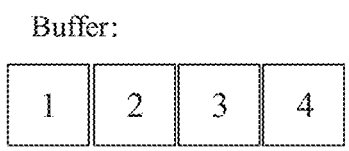
FIG. 5B is a structure diagram of another buffer filling according to the related technical solution.

When isTransposed is 1, all reference samples redL corresponding to the left side are stored in pTemp first, and all reference samples redT corresponding to the top side are stored from a next bit immediately following all stored redL on. As shown in FIG. 5B, still taking a 4×4 current block as an example, redL includes a reference sample 1 and a reference sample 2, and redT includes a reference sample 3 and a reference sample 4; thus, the buffer order in pTemp is the reference sample 1, the reference sample 2, the reference sample 3, and the reference sample 4. Since the reference samples corresponding to the top side are all stored after the reference samples corresponding to the left side, transposition is required here, and the transposed buffer is determined as the initial input reference sample set.

Figure 5C:
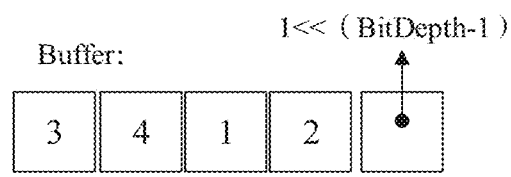
FIG. 5C is a structure diagram of buffer filling according to an embodiment of the present disclosure.

Thus, after the initial input reference sample set is obtained, a data unit may be expanded after the initial input reference sample set. The data unit is configured to buffer a preset parameter value, i.e., to store 1<<(BitDepth−1), as shown in FIG. 5C. In FIG. 5C, stilling taking a 4×4 current block as an example, four values are stored in the initial input reference sample set, namely reference samples after down-sampling of the reference samples. In the embodiment of the present disclosure, five values are stored in the input reference sample set. i.e., in addition to the reference samples obtained by the down-sampling of the four reference samples, a preset parameter value is further stored.

In S303, an input sample matrix is determined by means of a first preset calculation model based on the input reference sample set.

It is to be noted that input samples are matrix vectors to be subjected to matrix multiplication. The current solution is determined by an initial buffer (represented by pTemp), the type (represented by mipSizeId) of current block, a bitdepth value (represented by BitDepth) corresponding to a to-be-predicted colour component, and the number of input samples, and finally an $x^{th}$ input sample (represented by P[x]) in the input sample matrix is obtained. When mipSizeId=0 or 1, a sample at $0^{th}$ position of pTemp needs to be subtracted from 1<<(BitDepth−1) to be P[0], and a sample corresponding to each of other positions need to be subtracted from the sample at the $0^{th}$ position of pTemp to be P[x]. Details are as follows.

$$\begin{cases} p[0] = pTemp[0] - (1 \ll (BitDepth-1)) \\ p[x] = pTemp[x] - pTemp[0] \end{cases} \quad (3)$$

When mipSizeId=2, a first position of the initial buffer pTemp may be ignored, and a value sample corresponding to each of other positions is subtracted from the sample corresponding to the $0^{th}$ position, to be stored at a previous position. Details are as follows.

$$p[x]=p\text{Temp}[x+1]-p\text{Temp}[0] \quad (4)$$

Figure 6A:
FIG. 6A is a structure diagram of determination of input samples according to the related technical solution.

As shown in FIG. 6A, still taking a 4×4 current block as an example, four values are stored in the initial buffer, and the number of input samples is four, then four input samples may be determined according to formulas (3) and (4), which may be represented by p[x], where x=0, 1, 2, and 3. Thus, a 1×4 input sample matrix is formed. However, in the current solution, the derivation process of matrix multiplication input samples needs to be related to the type mipSizeId of current block, which makes the derivation process complicated and has a certain degree of complexity. In addition, in case where mipSizeId=0 or 1, the calculation formulas of p[0] and p[i] are different, which is not conducive to parallel processing.

In the embodiment of the present disclosure, the initial buffer may be expanded to the input reference sample set, and used to store 1<<(BitDepth−1), so that the derivation process of input samples is no longer related to the type mipSizeId of the current block, and the derivation process of input samples for matrix multiplication is unified. In addition, the input samples may be determined only through the input reference sample set (still represented by pTemp) and the number of input samples, so that an $i^{th}$ input sample (represented by p[i]) in the input sample matrix is acquired.

Specifically, in some embodiments, for S303, the operation that an input sample matrix is determined by means of a first preset calculation model based on the input reference sample set may include the following operations.

An $i^{th}$ input sample is calculated by means of a first preset calculation model according to a sample corresponding to a $(i+1)^{th}$ position and a sample corresponding to the $0^{th}$ position in the input reference sample set, where i is a positive integer greater than or equal to 0 and less than N, N representing the number of elements contained in the input sample matrix.

The input sample matrix is formed according to N input samples obtained by calculation.

Further, in some embodiments, the operation that an $i^{th}$ input sample is calculated by means of a first preset calculation model may include the following operation.

A subtraction operation is performed by means of the first preset calculation model to obtain the $i^{th}$ input sample.

Furthermore, in some embodiments, the method may further include the following operations.

The minuend of the subtraction operation is set to be equal to the sample corresponding to the $(i+1)^{th}$ position in the reference sample set; and the subtraction of the subtraction operation is set to be equal to the sample corresponding to the $0^{th}$ position in the reference sample set.

Figure 6B:
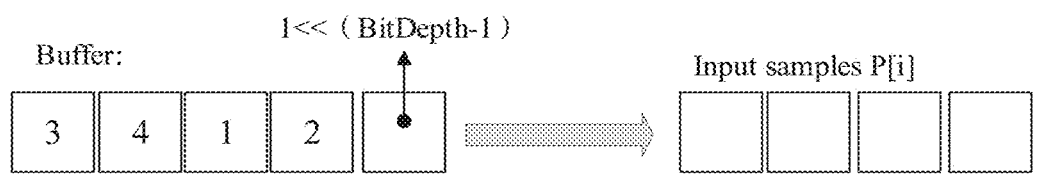
FIG. 6B is another structure diagram of determination of input samples according to an embodiment of the present disclosure.

In other words, regardless of the type of current block, a sample at the first position, namely the $0^{th}$ position, in the input reference sample set may be ignored; then a sample corresponding to each of other positions is subtracted from the sample corresponding to the $0^{th}$ position, to be stored in a previous position. Here, the first preset calculation model is as shown as the following formula:

$$p[i]=p\text{Temp}[i+1]-p\text{Temp}[0] \quad (5)$$

where i=0, 1 . . . N−1, N is the number of input samples (which may also be represented by inSize), and the number of input samples is the number of elements contained in the input sample matrix; pTemp[0] represents the sample corresponding to the $0^{th}$ position, pTemp [i+1] represents the sample corresponding to the $(i+1)^{th}$ position, and p[i] represents the $i^{th}$ input sample. As such, after N input samples are obtained, an input sample matrix may be formed. As shown in FIG. 6B, still taking a 4×4 current block as an example, five values are stored in the input reference sample set, but the number of input samples is four, then regardless of the type of the current block, four input samples may be determined according to formula (5), which is represented by p[i], where i=0, 1, 2, and 3; and thus, a 1×4 input sample matrix is formed.

In S304, colour component prediction is performed on the current block according to the input sample matrix to obtain a prediction block of the current block.

It is to be noted that after the input sample matrix is obtained, a temporary predicted value of at least one sample in the MIP block may be calculated first; then clipping processing, transposition processing, and up-sampling processing are carried out in sequence to finally obtain the prediction block of the current block.

It is also to be noted that, assuming that a to-be-predicted colour component is a luma component, the current block may be a present luma block, and finally a luma prediction block of the current luma block may be obtained, in which a luma predicted value of at least one sample is provided; or assuming that the to-be-predicted colour component is a chroma component, then the current block may be a current chroma block, and finally a chroma prediction block of the present chroma block may be obtained, in which a chroma predicted value of at least one sample is provided. No limits are made thereto in the embodiment of the present disclosure.

Figure 7:
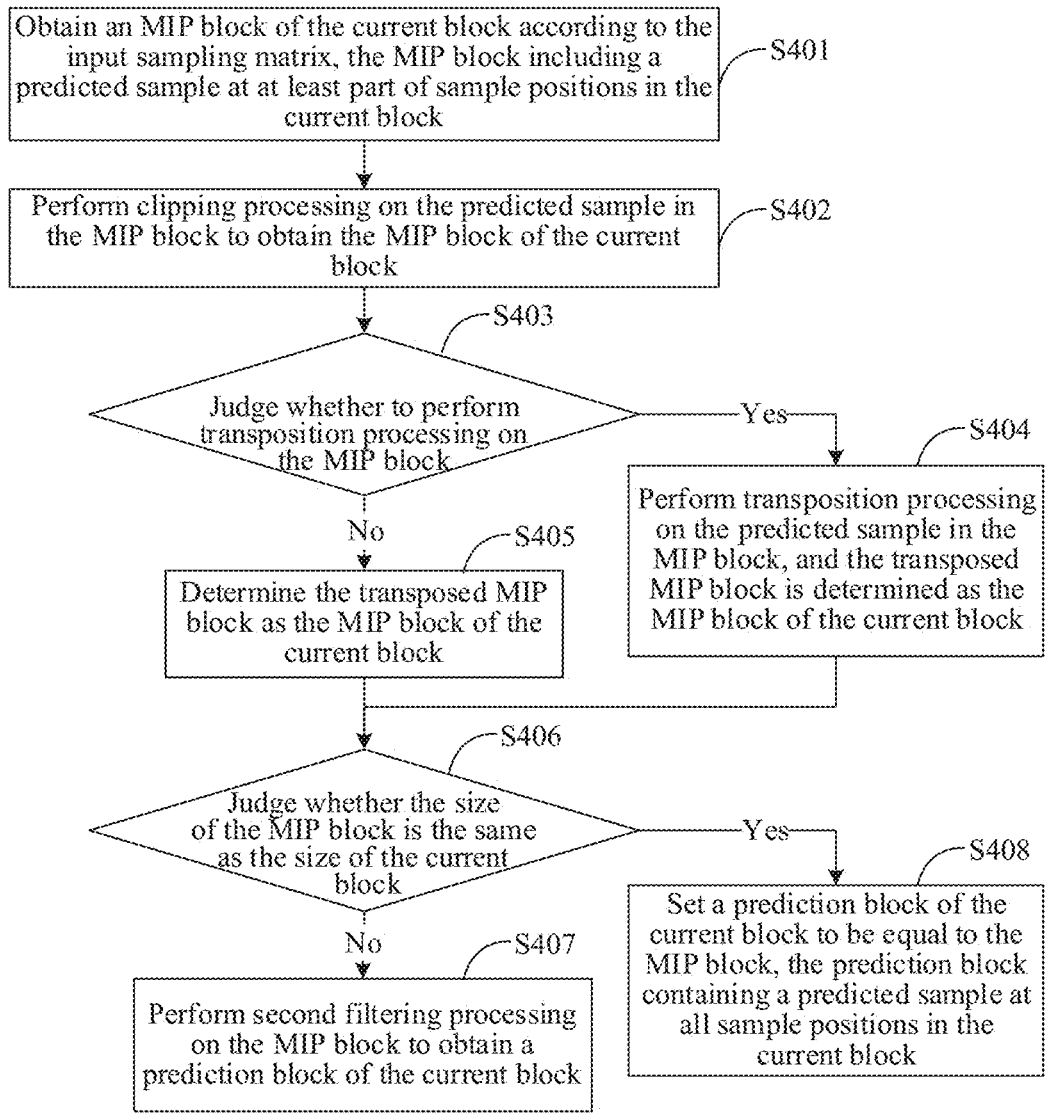
FIG. 7 is a flowchart of another method for colour component prediction according to an embodiment of the present disclosure.

In some embodiments, for S304, the step that colour component prediction is performed on the current block according to the input sample matrix to obtain a prediction block of the current block, as shown in FIG. 7, may include the following steps.

In S401, an MIP block of the current block is obtained according to the input sample matrix, the MIP block including a predicted sample at at least part of sample positions in the current block.

Figure 8:
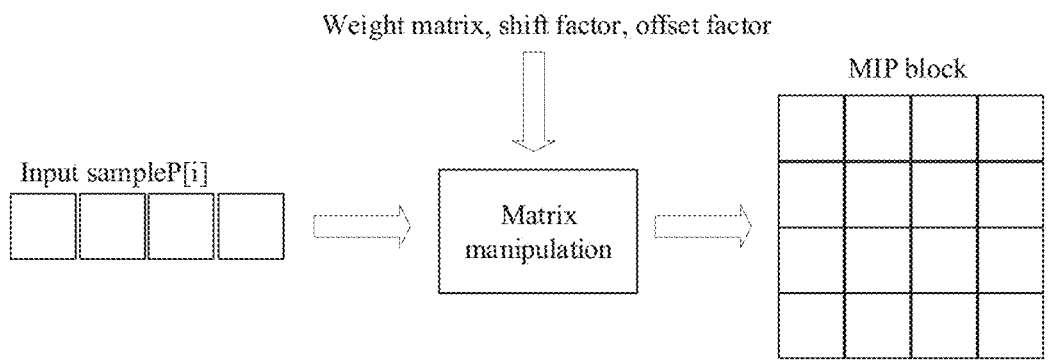
FIG. 8 is a structure diagram of generation of a predicted value according to an embodiment of the present disclosure.

It is to be noted that after the input sample matrix is obtained, a weight matrix (represented by mWeight), a shift factor (represented by sW) and an offset factor (represented by fO) corresponding to the current block may also be obtained; then as shown in FIG. 8, a temporary predicted value (represented by predMip) of at least one sample in the MIP block may be calculated by means of a second preset prediction model to obtain the MIP block.

Further, in some embodiments, for S401, the operation that the MIP block of the current block is obtained according to the input sample matrix may include the following operations.

A weight matrix, a shift factor, and an offset factor corresponding to the current block are acquired.

Matrix multiplication processing is performed on the input sample matrix, the weight matrix, the shift factor, and the offset factor by means of a second preset calculation model to calculate the MIP block.

That is, in the encoder or the decoder, a weight matrix table is pre-established, and the weight matrix table is stored in the encoder or decoder. Thus, according to the current block type mipSizeId and the MIP mode modeId, a weight matrix mWeight[x][y] that the current block needs to use may be determined by looking up the table.

In addition, in the encoder or the decoder, a shift factor table is also pre-established, as shown in Table 1, and an offset factor table, as shown in Table 2. And the shift factor table and the offset factor table are also stored in the encoder or decoder. Thus, according to the type of current block mipSizeId and the MIP mode modeId, the shift factor sW and the offset factor fO that need to be used for the current block may also be determined by looking up the tables.

equal to 8. Thus, according to the above formula (6), the temporary predicted value of at least one sample in the MIP block predMip may be calculated to obtain the MIP block.

In S402, clipping processing is performed on the predicted sample in the MIP block to obtain the MIP block of the current block.

It is to be noted that, after the temporary predicted value of at least one sample in the MIP block is obtained, the temporary predicted value of at least one sample in the MIP block may be subjected to clipping processing. Specifically, if the temporary predicted value is less than 0, it can be set to 0; if the temporary predicted value is greater than (1<<BitDepth)−1, then it can be set to (1<<BitDepth)−1, so that a range of the predicted value can be clippinged between 0 and (1<<BitDepth)−1.

In this way, after the MIP block is subjected to clipping processing, the predicted value of at least one sample in the MIP block may be obtained, and the range of the predicted value is between 0 and (1<<BitDepth)−1; and then it is determined whether transposition processing is required according to the transposition flag bit isTransposed, so that the final MIP block is determined.

In S403, it is judged whether to perform transposition processing on the MIP block.

TABLE 1

| | modeId | | | | | | | | | | | | | | | |
|---|---|---|---|---|---|---|---|---|---|---|---|---|---|---|---|---|
| mipSizeId | 0 | 1 | 2 | 3 | 4 | 5 | 6 | 7 | 8 | 9 | 10 | 11 | 12 | 13 | 14 | 15 |
| 0 | 6 | 5 | 5 | 5 | 5 | 6 | 6 | 6 | 6 | 6 | 6 | 5 | 6 | 5 | 5 | 5 |
| 1 | 7 | 7 | 6 | 6 | 6 | 6 | 6 | 6 | | | | | | | | |
| 2 | 6 | 7 | 5 | 6 | 6 | 6 | | | | | | | | | | |

TABLE 2

| | modeId | | | | | | | | | | | | | | | |
|---|---|---|---|---|---|---|---|---|---|---|---|---|---|---|---|---|
| mipSizeId | 0 | 1 | 2 | 3 | 4 | 5 | 6 | 7 | 8 | 9 | 10 | 11 | 12 | 13 | 14 | 15 |
| 0 | 9 | 9 | 16 | 20 | 29 | 22 | 9 | 6 | 16 | 14 | 21 | 26 | 19 | 23 | 28 | 17 |
| 1 | 15 | 14 | 23 | 24 | 10 | 14 | 10 | 27 | | | | | | | | |
| 2 | 15 | 19 | 46 | 16 | 14 | 11 | | | | | | | | | | |

Thus, after the type mipSizeId of the current block and the MIP mode modeId are acquired, the weight matrix mWeight[x][y], the shift factor sW, and the offset factor fO may be determined by looking up the tables, that is, the MIP block predMip[x][ ]y may be calculated. The second reset calculation model is shown below.

$$\begin{cases} oW = (1 \ll (sW-1)) - fO \times \left(\sum_{k=0}^{inSize-1} p[i]\right) \\ predMip[x][y] = \left(\left(\left(\sum_{k=0}^{inSize-1} mWeight[i][y \times predSize + x] \times p[i]\right) + oW\right) \gg sW\right) + pTemp[0] \end{cases} \quad (6)$$

where [x][y] represents position coordinates of a sample, x represents a horizontal direction, and y represents a vertical direction, inSize represents the number of input samples, and predSize represents a side length of the MIP block predMip. Here, predSize is only related to the type mipSizeId of the current block; when mipSizeId=0 or 1, the output MIP block is 4×4, then predSize is equal to 4; when mipSizeId=2, the output MIP block is 8×8, so predSize is In S404, when a judgment result is "yes", transposition processing is performed on the predicted sample in the MIP block, and the transposed MIP block is determined as the MIP block of the current block.

In S405, when a judgment result is "no", transposition processing is performed on the predicted sample in the MIP block, and the transposed MIP block is determined as the MIP block of the current block.

In S406, it is determined whether the size of the MIP block is the same as the size of the current block.

When applied to the encoder side, in some embodiments, for S403, the operation that whether to perform transposition processing on the MIP block is judged may include the following operations.

A first cost value when transposition processing is performed on the MIP block and a second cost value when transposition processing is not performed on the MIP block are respectively calculated by using an RDO manner.

When the first cost value is less than the second cost, it is determined to perform transposition processing on the MIP block; or when the first cost value is no less than the second cost, it is determined not to perform transposition processing on the MIP block.

When applied to the decoder side, in some embodiments, for S403, the operation that whether to perform transposition processing on the MIP block is judged may include the following operations.

A bitstream is parsed to obtain a value of a transposition processing indication flag.

It is judged whether to perform transposition processing on the MIP block according to the value of the transposition processing.

It is to be noted that the transposition processing indication flag is represented by isTransposed, whether the MIP block needs to be transposed may be judged according to the value of isTransposed. Specifically, on the encoder side, if the first cost value is less than the second cost value, the value of isTransposed is 1, then it can be determined that the MIP block needs to be transposed; or if the first cost value is no less than the second cost value, the value of isTransposed is 0, then it can be determined that the MIP block does not need to be transposed. On the decoder side, the value of the transposition processing indication flag may be obtained by parsing the bitstream; if the value of isTransposed is parsed to be 1, then it can be determined that the MIP block needs to be transposed; or, if the value of isTransposed is parsed to be 0, it can be determined that the MIP block does not need to be transposed.

More specifically, when isTransposed is 0, it indicates that the MIP block does not need to be transposed, then the MIP block predMip may be directly used to perform subsequent steps, i.e., to perform S406 and judge whether the size of the MIP block is the same as the size of the current block; when isTransposed is 0, it indicates that the MIP block needs to be transposed, then transposition processing may be performed with the following formula:

$$\begin{cases} predTemp[y][x] = predMip[x][y] \\ predMip = predTemp \end{cases} \quad (7)$$

Thus, according to formula (7), the transposed MIP block may be obtained after the MIP block is subjected to the transposition processing, and serves as an MIP block. Then, S406 is also performed to judge whether the size of the MIP block is the same as the size of the current block.

In S407, when a size of the MIP block is different from a size of the current block, second filtering processing is performed on the MIP block to obtain a prediction block of the current block.

In S408, when the size of the MIP block is the same as the size of the current block, a prediction block of the current block is set to be equal to the MIP block, the prediction block containing a predicted sample at all sample positions in the current block.

Further, the second filtering processing may include up-sampling filtering or low-pass filtering.

It is be noted that after the MIP block is obtained, the size of the MIP block only includes two types: a 4×4 MIP block and an 8×8 MIP block, and thus the size of the current block may be the same as or different from the size of the MIP block. In other words, the current block may not be filled with the sample corresponding to the MIP block, resulting in that an up-sampling operation on the MIP block may be required for generation of a final predicted value, that is, by judging whether the size of the MIP block is the same as the size of the current block, it may be determined whether to perform up-sampling processing on the MIP block.

Specifically, when the size of the MIP block is the same as the size of the current block, that is, the width and height of the MIP block are the same as those of the current block, indicating that the MIP block does not need to be up-sampled, and then the current block may be filled with the MIP block directly, that is, there are no vacant samples in the filled current block, and a predicted value of each sample in the current block may be directly set to a predicted value of each sample in the MIP block, as shown below.

$$predSamples[x][y]=predMip[x][y] \quad (8)$$

where [x][y] represents position coordinates of a sample, x represents a horizontal direction, y represents a vertical direction, predSamples[x][y] represents a predicted value corresponding to a sample at position coordinates [x][y] in the current block, predMip[x][y] represents a predicted value corresponding to a sample at position coordinates [x][y] in the MIP block. Thus, according to the formula (8), the MIP block predMip[x][y] may be directly used as the prediction block predSamples [x][y] of the current block.

When the size of the MIP block is different from the size of the current block, that is, one of the width and height of the MIP block is different from that of the current block, indicating that the MIP block needs to be up-sampled, and after the up-sampling processing, the prediction block of the current block may be obtained.

Specifically, in some embodiments, for S407, when the second filtering processing refers to up-sampling filtering, the method may further include the following operations.

A horizontal up-sampling factor and a vertical up-sampling factor corresponding to the current block are determined.

According to the MIP block, the horizontal up-sampling factor and the vertical up-sampling factor, a predicted value of a to-be-filled sample position in the current block is determined by means of a third preset calculation model to obtain a prediction block of the current block, the to-be-filled sample position being a sample position in the current block block different from a sample position in the MIP block.

It is to be noted that when the size of the MIP block is different from the size of the current block, vacant samples exist in the current block after being filled, then the MIP block predMip[x][y] needs to be subjected to up-sampling in a linear interpolation mode.

Here, assuming that both the width and height of the MIP block are predSize, the width of the current block is nTbW, and the height of the current block is nTbH, then according to the side length predSize of the MIP block and the width nTbW of the current block, the horizontal up-sampling factor (represented by upHor) may be calculated. Similarly, according to the side length predSize of the MIP block and the height nTbH of the current block, the vertical up-sampling factor (represented by upVer) may be calculated. The specific calculation formula is as follows.

$$\begin{cases} upHor = nTbW/predSize \\ upVer = nTbH/predSize \end{cases} \quad (9)$$

Since the MIP block cannot fill up the current block, the current block needs to be filled according to the horizontal up-sampling factor upHor and the vertical up-sampling factor upVer, that is, the up-sampling operation is performed. The method for filling the corresponding position is as follows.

$$predSamples[(x+1)\times upHor-1][(y+1)\times upVer-1]=predMip[x][y] \quad (10)$$

where x=0, 1, . . . , vnTbW−1; y=0, 1, . . . , nTbH−1.

Here, the specific up-sampling manner is to first fill to the positions corresponding to the previous line of the current block predSamples[x][−1] with the upper reference samples refT, and then fill the positions predSamples[−1][y] corresponding to the left column of the current block with the left reference samples refL of the left side. Then, according to formula (10), for the sample positions to be filled in the current block, for example, a vacant position between the predicted values at the corresponding positions, or a vacant position between the reference samples and the predicted value filling the corresponding position, etc., horizontal interpolation is performed followed by vertical interpolation, so that an up-sampling result predSamples[x][y] of the current block is obtained finally. The predSamples[x][y] is a predicted value of the current block according to the MIP mode.

In the embodiment of the present disclosure, when the method for colour component prediction is applied to the encoder side, the method for colour component prediction can be used to calculate the predicted value of at least one sample in the current block. A residual corresponding to the at least one sample is calculated according to a difference value between a true value and a predicted value of the at least one sample in the current block, and the obtained residual is written in a bitstream. In addition, after the transposition processing indication flag (isTransposed) is obtained, the value of isTransposed also needs to be written in the bitstream, and then the bitstream is transmitted from the encoder side to the decoder side. Correspondingly, when the method for colour component prediction is applied to the decoder side, the value of isTransposed may be determined by parsing the bitstream, and then whether transposition processing is required is determined. In addition, the method for colour component prediction may also be used to calculate the predicted value of at least one sample in the current block, the residual corresponding to the at least one sample may be directly obtained by parsing the bitstream, and thus, according to the predicted value and residual of the at least one sample in the current block, the true value of the at least one sample in the current block can be obtained.

The embodiment provides a method for colour component prediction, which is applied to an encoder or a decoder. A neighbouring reference sample set of a current block is determined, and a preset parameter value corresponding to the current block is determined, the neighbouring reference sample set including at least one reference sample; the neighbouring reference sample set and the preset parameter value are buffered to construct an input reference sample set; an input sample matrix is determined by means of a first preset calculation model according to the reference sample set; and colour component prediction is performed on the current block according to the input sample matrix to obtain a prediction block of the current block. Thus, in the solutions of the embodiments of the present disclosure, judgment of the type of current block is omitted, the time complexity is reduced, and hardware implementation is facilitated; in addition, the input sample matrix may be determined based on the input reference sample set and the first preset calculation model, while the derivation process of the input samples for matrix multiplication is also simplified, so that the derivation process of the input sample matrix is unified, and the solutions of the embodiments of the present disclosure no longer depend on the type of the current block and can further realize parallel processing, thereby reducing the calculation complexity.

Figure 9:
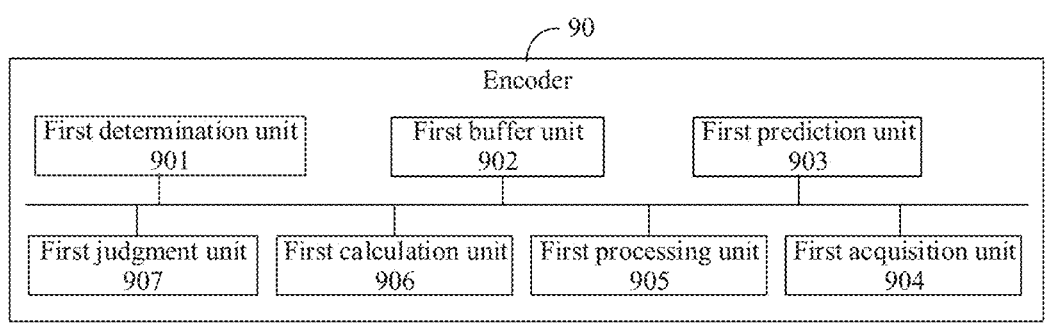
FIG. 9 is a composition structure diagram of an encoder according to an embodiment of the present disclosure.

Based on the same inventive concept of the abovementioned embodiments, referring to FIG. 9, a composition structure diagram of an encoder 90 according to an embodiment of the present disclosure is shown. As shown in FIG. 9, the encoder 90 includes a first determination unit 901, a first buffer unit 902, and a first prediction unit 903.

The first determination unit 901 is configured to determine a neighbouring reference sample set of a current block, and determine a preset parameter value corresponding to the current block, the neighbouring reference sample set including at least one reference sample.

The first buffer unit 902 is configured to buffer the neighbouring reference sample set and the preset parameter value to construct an input reference sample set.

The first determination unit 901 is further configured to determine an input sample matrix by means of a first preset calculation model based on the input reference sample set.

The first prediction unit 903 is configured to perform colour component prediction on the current block according to the input sample matrix to obtain a prediction block of the current block.

In the above solution, referring to FIG. 9, the encoder 90 may further include a first acquisition unit 904, configured to acquire a reference sample neighbouring to at least one side of the current block, the at least one side of the current block including at least one of a top side, a top-right side, a left side, or a bottom-left side.

The first determination unit 901 is configured to determine a neighbouring reference sample set of the current block according to the acquired reference sample.

In the above solution, referring to FIG. 9, the encoder 90 may further include a first processing unit 905, configured to perform first filtering processing on a reference sample neighbouring to at least one side of the current block to determine reference sample neighbouring to the at least one side.

The first determination unit 901 is configured to form the neighbouring reference sample set of the current block according to the acquired reference sample.

In the above solution, the first filtering processing includes down-sampling filtering or low-pass filtering.

In the above solution, the first acquisition unit 904 is further configured to determine a bitdepth value corresponding to a to-be-predicted colour component of the current block.

The first processing unit 905 is further configured to perform a shift on 1 by the bitdepth value minus 1 to obtain the preset parameter value.

In the above solution, the first buffer unit 902 is configured to buffer the neighbouring reference sample to obtain an initial input reference sample set, and buffer the preset parameter values by using a data unit after the initial input reference sample set, to obtain the input reference sample set.

In the above solution, the first determination unit 901 is further configured to determine a value of a transposition processing indication flag by using an RDO manner.

The first buffer unit 902 is specifically configured to, when the value of the transposition processing indication flag is equal to 0, store a reference sample in a buffer such that a reference sample corresponding to the top side of the current block in the neighbouring reference sample set is stored ahead of a reference sample corresponding to the left side of the current block in the neighbouring reference sample set, and determine the buffer as the initial input reference sample set; or when the value of the transposition processing indication flag is equal to 1, store the reference sample in a buffer such that the reference sample corresponding to the top side of the current block in the neighbouring reference sample set is stored after the reference sample corresponding to the left side of the current block in the neighbouring reference sample set, perform transposition processing on the buffer, and determine the transposed buffer as the initial input reference sample set.

In the above solution, referring to FIG. 9, the encoder 90 may further include a first calculation unit 906 which is configured to calculate an $i^{th}$ input sample by means of a first preset calculation model according to a sample corresponding to the $(i+1)^{th}$ position and a sample corresponding to the $0^{th}$ position in the reference sample set, where i is a positive integer greater than or equal to 0 and less than N. N representing the number of elements contained in the input sample matrix.

The first determination unit 901 is configured to form the input sample matrix according to N input samples obtained by calculation.

In the above solution, the first calculation unit 906 is specifically perform a subtraction operation by means of the first preset calculation model to obtain the $i^{th}$ input sample.

In the above solution, the first calculation unit 906 is specifically configured to set the minuend of the subtraction operation to be equal to the sample corresponding to the $(i+1)^{th}$ position in the reference sample set; and set the subtraction of the subtraction operation to be equal to the sample corresponding to the $0^{th}$ position in the reference sample set.

In the above solution, the first acquisition unit 904 is further configured to obtain an MIP block of the current block according to the input sample matrix, the MIP block including a predicted sample at at least part of sample positions in the current block.

The first processing unit 905 is further configured to, when one of a width and a height of the MIP block is different from that of the current block, perform second filtering processing on the MIP block to obtain a prediction block of the current block; or, when both of a width and a height of the MIP block are the same as those of the current block, set a prediction block of the current block to be equal to the MIP block, the prediction block containing a predicted sample at all sample positions in the current block.

In the above solution, the first acquisition unit 904 is specifically configured to perform clipping processing on the predicted sample in the MIP block to obtain the MIP block of the current block.

In the above solution, referring to FIG. 9, the encoder 90 may also include a first judgment unit 907, which is configured to judge whether to perform transposition processing on the MIP block, and when a judgment result is "yes", to perform transposition processing on the predicted sample in the MIP block, and determine the transposed MIP block as the MIP block of the current block.

In the solution, the first calculation unit 906 is further configured to calculate a first cost value when transposition processing is performed on the MIP block and a second cost value when transposition processing is not performed on the MIP block.

The first judgment unit 907 is specifically configured to, when the first cost value is no less than the second cost value, determine not to perform transposition processing on the MIP block.

In the above solution, the second filtering processing includes up-sampling filtering or low-pass filtering.

In the above solution, the first acquisition unit 904 is further configured to acquire a weight matrix, a shift factor, and an offset factor corresponding to the current block.

The first calculation unit 906 is further configured to perform matrix multiplication processing on the input sample matrix, the weight matrix, the shift factor, and the offset factor by means of a second preset calculation model, to calculate the MIP block.

In the above solution, when the second filtering processing is the up-sampling filtering, the first determination unit 901 is further configured to determine a horizontal up-sampling factor and a vertical up-sampling factor corresponding to the current block;

The first calculation unit 906 is further configured to determine, according to the MIP block, the horizontal up-sampling factor and the vertical up-sampling factor, a predicted value of a to-be-filled sample position in the current block by means of a third preset calculation model to obtain a prediction block of the current block, the to-be-filled sample position being a sample position in the current block different from a sample position in the MIP block.

It can be understood that, in the embodiment of the present disclosure, "unit" may be part of a circuit, part of a processor, part of a program or software and the like, of course, may also be modular and may also be non-modular. In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device, etc.) or a processor to execute all or part of the steps of the method in the embodiment. The abovementioned storage medium includes: various media capable of storing program codes such as a U disk, a mobile hard disk, a ROM, a RAM, a magnetic disk or an optical disk.

Thus, the embodiment of the present disclosure provides a computer storage medium, which is applied to an encoder 90, and stores a colour component prediction program. The colour component prediction program is executed by a first processor to implement any method as described in the abovementioned embodiments.

Figure 10:
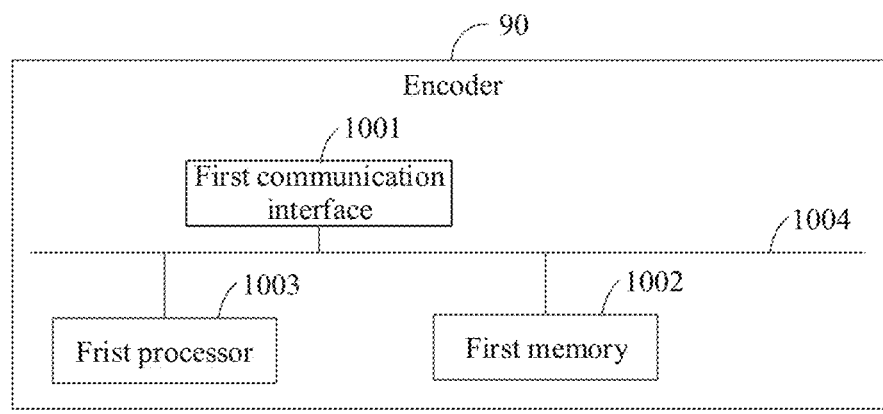
FIG. 10 is a specific hardware structure diagram of an encoder according to an embodiment of the present disclosure.

Based on the composition of the encoder 90 and the computer storage medium, referring to FIG. 10, a specific hardware structure example of the encoder 90 according to the embodiment of the present disclosure is shown, and may include a first communication interface 1001, a first memory 1002, and a first processor 1003. Each component is coupled together through a first bus system 1004. It can be understood that the first bus system 1004 is configured to implement connection communication between these components. The first bus system 1004 includes a data bus, and further includes a power bus, a control bus, and a state signal bus. However, for clear description, various buses in FIG. 10 are marked as the first bus system 1004.

The first communication interface 1001 is configured to receive and send a signal in a process of receiving and sending information with another external network element.

The first memory 1002 is configured to store a computer program capable of running in the first processor 1003.

The first processor 1003 is configured to run the computer program to execute the following operations.

A neighbouring reference sample set of the current block is determined, and a preset parameter value corresponding to the current block is determined, the neighbouring reference sample set including at least one reference sample.

The neighbouring reference sample set and the preset parameter value are buffered to construct an input reference sample set.

An input sample matrix is determined by means of a first preset calculation model based on the input reference sample set.

Colour component prediction is performed on the current block according to the input sample matrix to obtain a prediction block of the current block.

It can be understood that the first memory 1002 in the embodiment of the present disclosure may be a volatile memory or a nonvolatile memory, or may include both the volatile and nonvolatile memories. The nonvolatile memory may be a ROM, a PROM, an Erasable PROM (EPROM), an EEPROM, or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It is to be noted that the memory of a system and method described in the disclosure is intended to include, but not limited to, memories of these and any other proper types.

The first processor 1003 may be an integrated circuit chip with a signal processing capability. In an implementation process, each step of the method may be completed by an integrated logic circuit of hardware in the first processor 1003 or an instruction in a software form. The processor 1003 may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the present disclosure may be implemented or executed. The universal processor may be a microprocessor or the processor may also be any conventional processor, etc. The steps of the method disclosed in combination with the embodiments of the present disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM, and a register. The storage medium is located in the first memory 1002. The first processor 1003 reads information in the first memory 1002 and completes the steps of the method in combination with hardware.

It can be understood that these embodiments described in the present disclosure may be implemented by hardware, software, firmware, middleware, a microcode or a combination thereof. In case of implementation with the hardware, the processing unit may be implemented in one or more ASICs, DSPs, DSP Devices (DSPDs), PLDs, FPGAs, universal processors, controllers, microcontrollers, microprocessors, other electronic units configured to execute the functions in the present disclosure or combinations thereof. In case of implementation with the software, the technology of the present disclosure may be implemented through the modules (for example, processes and functions) executing the functions in the present disclosure. A software code may be stored in the memory and executed by the processor. The memory may be implemented in the processor or outside the processor.

Optionally, as another embodiment, the first processor 1003 is further configured to run the computer program to execute any method in the abovementioned embodiments.

The embodiment provides an encoder. The encoder may include a first determination unit, a first buffer unit, and a first prediction unit. The first determination unit is configured to determine a neighbouring reference sample set of the current block and determine a preset parameter value corresponding to the current block. The first buffer unit is configured to buffer the neighbouring reference sample set and the preset parameter value to construct an input reference sample set; the first determination unit is further configured to determine an input sample matrix by means of a first preset calculation model based on the input reference sample set; and the first prediction unit is configured to perform colour component prediction on the current block according to the input sample matrix to obtain a prediction block of the current block. Thus, the derivation process of input samples for matrix multiplication is simplified, the derivation process of the input sample matrix is unified, judgment on the type of the current block is omitted, the time complexity is reduced, and implementation of hardware is facilitated.

Figure 11:
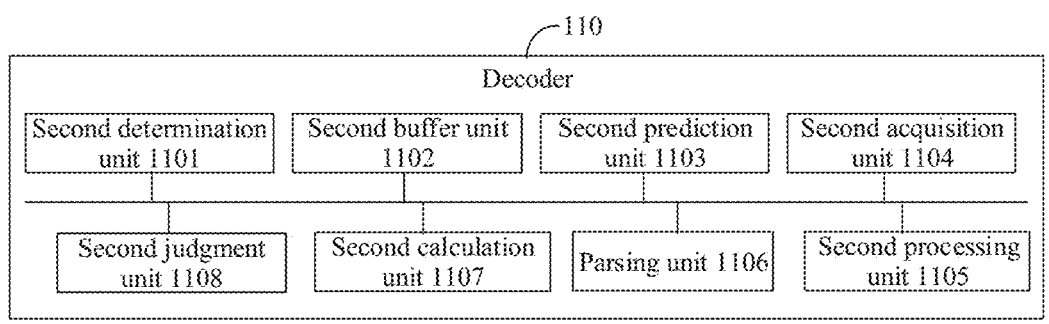
FIG. 11 is a composition structure diagram of a decoder according to an embodiment of the present disclosure.

Based on the same inventive concept of the abovementioned embodiments, referring to FIG. 11, a composition structure diagram of a decoder 110 according to an embodiment of the present disclosure is shown. As shown in FIG. 11, the decoder 110 includes a second determination unit 1101, a second buffer unit 1102, and a second prediction unit 1103.

The second determination unit 1101 is configured to determine a neighbouring reference sample set of a current block, and determine a preset parameter value corresponding to the current block, the neighbouring reference sample set including at least one reference sample.

The second buffer unit 1102 is configured to buffer the neighbouring reference sample set and the preset parameter value to construct an input reference sample set.

The second determination unit 1101 is further configured to determine an input sample matrix by means of a first preset calculation model based on the input reference sample set.

The second prediction unit 1103 is configured to perform colour component prediction on the current block according to the input sample matrix to obtain a prediction block of the current block.

In the above solution, referring to FIG. 11, the decoder 110 may further include a second acquisition unit 1104, configured to acquire a reference sample neighbouring to at least one side of the current block, the at least one side of the current block including at least one of a top side, a top-right side, a left side, or a bottom-left side.

The second determination unit 1101 is configured to determine a neighbouring reference sample set of the current block according to the acquired reference sample.

In the above solution, referring to FIG. 11, the decoder 110 may further include a second processing unit 1105, configured to perform first filtering processing on the reference sample neighbouring to at least one side of the current block to determine a reference sample neighbouring to the at least one side.

The second determination unit 1101 is configured to form the neighbouring reference sample set of the current block according to the acquired reference samples.

In the above solution, the first filtering processing includes down-sampling filtering or low-pass filtering.

In the above solution, the second acquisition unit 1104 is further configured to determine a bitdepth value corresponding to a to-be-predicted colour component of the current block.

The second processing unit 1105 is further configured to perform a shift on 1 by the bitdepth value minus 1 to obtain a preset parameter value.

In the above solution, the second buffer unit 1102 is configured to buffer the neighbouring reference sample to obtain an initial input reference sample set, and buffer the preset parameter value by using a data unit after the initial input reference sample set to obtain the input reference sample set.

In the above solution, referring to FIG. 11, the decoder 110 may further include a parsing unit 1106 configured to parse a bitstream to obtain a value of a transposition processing indication flag.

The second buffer unit 1102 is specifically configured to, when the value of the transposition processing indication flag is equal to 0, store a reference sample in a buffer, such that a reference sample corresponding to the top side of the current block in the neighbouring reference sample set is stored ahead of a reference sample corresponding to the left side of the current block in the neighbouring reference sample set, and determine the buffer as the initial input reference sample set; or when the value of the transposition processing indication flag is equal to 1, store the reference sample in a buffer, such that the reference sample corresponding to the top side of the current block in the neighbouring reference sample set is stored after the reference sample corresponding to the left side of the current block in the neighbouring reference sample set, perform transposition processing on the buffer, and determine the transposed buffer as the initial input reference sample set.

In the above solution, referring to FIG. 11, the decoder 110 may further include a second calculation unit 1107 which is configured to calculate an $i^{th}$ input sample by means of a first preset calculation model according to a sample corresponding to the $(i+1)^{th}$ position and a sample corresponding to the $0^{th}$ position in the reference sample set, where i is a positive integer greater than or equal to 0 and less than N, N representing the number of elements contained in the input sample matrix.

The second determination unit 1101 is configured to form the input sample matrix according to N input samples obtained by calculation.

In the above solution, the second calculation unit 1107 is specifically perform a subtraction operation by means of the first preset calculation model to obtain the $i^{th}$ input sample.

In the above solution, the second calculation unit 1107 is specifically configured to set the minuend of the subtraction operation to be equal to the sample corresponding to the $(i+1)^{th}$ position in the reference sample set; and set the subtraction of the subtraction operation to be equal to the sample corresponding to the $0^{th}$ position in the reference sample set.

In the above solution, the second acquisition unit 1104 is further configured to obtain an MIP block of the current block according to the input sample matrix, the MIP block including a predicted sample at at least part of sample positions in the current block.

The second processing unit 1105 is further configured to, when one of a width and a height of the MIP block is different from that of the current block, perform second filtering processing on the MIP block to obtain a prediction block of the current block; or, when both of a width and a height of the MIP block are the same as those of the current block, set a prediction block of the current block to be equal to the MIP block, the prediction block containing a predicted sample at all sample positions in the current block.

In the above solution, the second acquisition unit 1104 is specifically configured to perform clipping processing on the predicted sample in the MIP block to obtain the MIP block of the current block.

In the above solution, referring to FIG. 11, the decoder 110 may also include a second judgment unit 1108, which is configured to judge whether to perform transposition processing on the MIP block, and when a judgment result is "yes", to perform transposition processing on the predicted sample in the MIP block, and determine the transposed MIP block as the MIP block of the current block.

In the above solution, the parsing unit 1106 is specifically configured to parse a bitstream to obtain a value of a transposition processing indication flag.

The second judgment unit 1108 is specifically configured to judge, according to the value of the transposition processing, whether to perform transposition processing on the MIP block.

In the above solution, the second filtering processing includes up-sampling filtering or low-pass filtering.

In the above solution, the second acquisition unit 1104 is further configured to acquire a weight matrix, a shift factor, and an offset factor corresponding to the current block.

The second calculation unit 1107 is further configured to perform matrix multiplication processing on the input sample matrix, the weight matrix, the shift factor, and the offset factor by means of a second preset calculation model to calculate the MIP block.

In the above solution, the second determination unit 1101 is further configured to determine a horizontal up-sampling factor and a vertical up-sampling factor corresponding to the current block.

The second calculation unit 1107 is further configured to determine, according to the MIP block, the horizontal up-sampling factor and the vertical up-sampling factor, a predicted value of a to-be-filled sample position in the current block by means of a third preset calculation model to obtain a prediction block of the current block, the to-be-filled sample position being a sample position in the current block different from a sample position in the MIP block.

It can be understood that, in the embodiment, "unit" may be part of a circuit, part of a processor, part of a program or software and the like, of course, may also be modular and may also be non-modular. In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of a software functional module and sold or used not as an independent product, the integrated unit may be stored in a computer-readable storage medium. Based on such an understanding, the embodiment provides a computer storage medium, which is applied to a decoder 110 and stores a colour component prediction program. The colour component prediction program is executed by a second processor to implement any method as described in the abovementioned embodiments.

Figure 12:
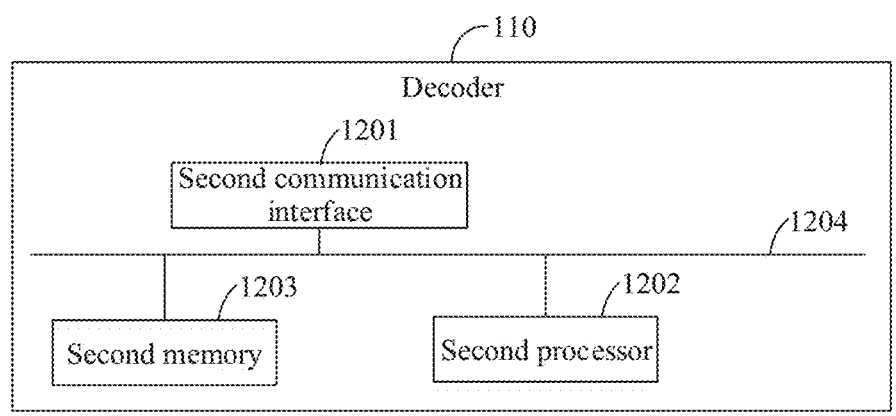
FIG. 12 is a specific hardware structure diagram of a decoder according to an embodiment of the present disclosure.

Based on the composition of the decoder 110 and the computer storage medium, referring to FIG. 12, a specific hardware structure example of the decoder 110 according to the embodiment of the present disclosure is shown, and may include a second communication interface 1201, a second memory 1202, and a second processor 1203. Each component is coupled together through a second bus system 1204. It can be understood that the second bus system 1204 is configured to implement connection communication between these components. The second bus system 1204 includes a data bus, and further includes a power bus, a control bus, and a state signal bus. However, for clear description, various buses in FIG. 12 are marked as the second bus system 1204.

The second communication interface 1201 is configured to receive and send a signal in a process of receiving and sending information with another external network element.

The second memory 1202 is configured to store a computer program capable of running in the second processor 1203.

The second processor 1203 is configured to run the computer program to execute the following operations.

A neighbouring reference sample set of a current block is determined, and a preset parameter value corresponding to the current block is determined, the neighbouring reference sample set including at least one reference sample.

The neighbouring reference sample set and the preset parameter value are buffered to construct an input reference sample set.

An input sample matrix is determined by means of a first preset calculation model based on the input reference sample set.

Colour component prediction is performed on the current block according to the input sample matrix to obtain a prediction block of the current block.

Optionally, as another embodiment, the second processor 1203 is further configured to run the computer program to execute any method in the abovementioned embodiments.

It can be understood that the second memory 1202 has a hardware function similar to that of the first memory 1002 and the second processor 1203 has a hardware function similar to that of the first processor 1003. Elaborations are omitted herein.

It is to be noted that, in the present disclosure, terms "include" and "contain" or any other variant thereof is intended to cover nonexclusive inclusions, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

The sequence numbers of the embodiments of the present disclosure are adopted not to represent superiority-inferiority of the embodiments but only for description.

The methods disclosed in some method embodiments provided in the present disclosure may be freely combined without conflicts to obtain new method embodiments.

The characteristics disclosed in some product embodiments provided in the present disclosure may be freely combined without conflicts to obtain new product embodiments.

The characteristics disclosed in some method or device embodiments provided in the present disclosure may be freely combined without conflicts to obtain new method embodiments or device embodiments.

The above is only the specific implementation mode of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

According to the embodiments of the present disclosure, a neighbouring reference sample set of a current block is determined, and a preset parameter value corresponding to the current block is determined; the neighbouring reference sample set and the preset parameter value are buffered to construct an input reference sample set; an input sample matrix is determined by means of a first preset calculation model according to the reference sample set, and colour component prediction is performed on the current block according to the input sample matrix to obtain a prediction block of the current block. Thus, in the solutions of the embodiments of the present disclosure, judgment of the type of the current block is omitted, the time complexity is reduced, and hardware implementation is facilitated. In addition, the input sample matrix may be determined based on the input reference sample set and the first preset calculation model, while the derivation process of the input samples for matrix multiplication is also simplified, so that the derivation process of the input sample matrix is unified, and the solutions of the embodiments of the present disclosure no longer depend on the type of the current block and can also realize parallel processing, thereby reducing the calculation complexity.

The invention claimed is:

1. A method for colour component prediction, applied to an encoder and comprising:
    determining a neighbouring reference sample set of a current block, wherein the neighbouring reference sample set comprises at least one reference sample;
    determining a preset parameter value corresponding to the current block, comprising:
    determining a bitdepth value corresponding to a to-be-predicted colour component of the current block; and performing a shift on 1 by the bitdepth value minus 1 to obtain the preset parameter value;
    determining an input sample matrix by means of a first preset calculation model based on the neighbouring reference sample set and the preset parameter value; and
    performing colour component prediction on the current block according to the input sample matrix to obtain a prediction block of the current block.

2. The method of claim 1, wherein determining an input sample matrix by means of a first preset calculation model based on the neighbouring reference sample set and the preset parameter value comprises:
   determining an input reference sample set based on the neighbouring reference sample set and the preset parameter;
   determining an input sample matrix by means of a first preset calculation model based on the input reference sample set.

3. The method of claim 1, wherein determining the neighbouring reference sample set of the current block comprises:
   acquiring a reference sample neighbouring to at least one side of the current block, the at least one side of the current block comprising at least one of a top side, a top-right side, a left side, or a bottom-left side; and
   determining the neighbouring reference sample set of the current block according to the acquired reference sample, comprising:
      performing first filtering processing on the acquired reference sample neighbouring to the at least one side of the current block to determine a reference sample neighbouring to the at least one side; and
      forming the neighbouring reference sample set of the current block according to the determined reference sample,
   wherein the first filtering processing comprises down-sampling filtering or low-pass filtering.

4. The method of claim 2, wherein determining the input reference sample set based on the neighbouring reference sample set and the preset parameter value comprises:
   buffering the neighbouring reference sample set to obtain an initial input reference sample set; and
   buffering the preset parameter value by using a data unit after the initial input reference sample set to obtain the input reference sample set.

5. The method of claim 4, wherein buffering the neighbouring reference sample set to obtain an initial input reference sample set comprises:
   determining a value of a transposition processing indication flag by using a Rate Distortion Optimization (RDO) manner;
   when the value of the transposition processing indication flag is equal to 0, storing the reference sample in a buffer such that a reference sample corresponding to a top side of the current block in the neighbouring reference sample set is stored ahead of a reference sample corresponding to a left side of the current block in the neighbouring reference sample set, and determining the buffer as the initial input reference sample set; or
   when the value of the transposition processing indication flag is equal to 1, storing the reference sample in the buffer such that the reference sample corresponding to the top side of the current block in the neighbouring reference sample set is stored after the reference sample corresponding to the left side of the current block in the neighbouring reference sample set, performing transposition processing on the buffer, and determining the transposed buffer as the initial input reference sample set.

6. The method of claim 2, wherein determining the input sample matrix by means of the first preset calculation model based on the input reference sample set comprises:
   performing, according to a sample corresponding to a $(i+1)^{th}$ position and a sample corresponding to a $0^{th}$ position in the input reference sample set, a subtraction operation by means of the first preset calculation model, to obtain an $i^{th}$ input sample, wherein a minuend of the subtraction operation is set to be equal to the sample corresponding to the $(i+1)^{th}$ position in the input reference sample set; and a subtraction of the subtraction operation is set to be equal to the sample corresponding to the $0^{th}$ position in the input reference sample set, and wherein i is a positive integer greater than or equal to 0 and less than N, N representing a number of elements contained in the input sample matrix; and
   forming the input sample matrix according to N input samples obtained by calculation.

7. The method of claim 1, wherein performing colour component prediction on the current block according to the input sample matrix to obtain the prediction block of the current block comprises:
   obtaining a Matrix-based Intra Prediction (MIP) block of the current block according to the input sample matrix, comprising:
      acquiring a weight matrix, a shift factor, and an offset factor corresponding to the current block;
      performing matrix multiplication processing on the input sample matrix, the weight matrix, the shift factor, and the offset factor by means of a second preset calculation model, to calculate the MIP block; and
      performing clipping processing on the predicted sample in the MIP block to obtain the MIP block of the current block;
   wherein the MIP block comprises the predicted sample in at least part of sample positions in the current block;
   when one of a width and a height of the MIP block is different from that of the current block, performing second filtering processing on the MIP block to obtain the prediction block of the current block; or
   when both of the width and the height of the MIP block are the same as those of the current block, setting the prediction block of the current block to be equal to the MIP block, wherein the prediction block contains a predicted sample at all sample positions in the current block.

8. The method of claim 7, wherein obtaining the MIP block of the current block according to the input sample matrix comprises:
   calculating, by using the RDO manner, a first cost value when transposition processing is performed on the MIP block and a second cost value when transposition processing is not performed on the MIP block;
   when the first cost value is less than the second cost value, determining to perform transposition processing on the predicted sample in the MIP block, and determining the transposed MIP block as the MIP block of the current block; or
   when the first cost value is no less than the second cost value, determining not to perform transposition processing on the MIP block.

9. The method of claim 7, wherein the second filtering processing comprises up-sampling filtering or low-pass filtering,
   wherein when the second filtering processing is the up-sampling filtering, the method further comprises:
   determining a horizontal up-sampling factor and a vertical up-sampling factor corresponding to the current block; and
   determining, according to the MIP block, the horizontal up-sampling factor and the vertical up-sampling factor, a predicted value of a to-be-filled sample position in the current block by means of a third preset calculation model, to obtain the prediction block of the current block, wherein the to-be-filled sample position is a sample position in the current block different from a sample position in the MIP block.

10. A method for colour component prediction, applied to a decoder and comprising:
   determining a neighbouring reference sample set of a current block, wherein the neighbouring reference sample set comprises at least one reference sample;
   determining a preset parameter value corresponding to the current block, comprising:
   determining a bitdepth value corresponding to a to-be-predicted colour component of the current block; and performing a shift on 1 by the bitdepth value minus 1 to obtain the preset parameter value;
   determining an input sample matrix by means of a first preset calculation model based on the neighbouring reference sample set and the preset parameter value; and
   performing colour component prediction on the current block according to the input sample matrix to obtain a prediction block of the current block.

11. The method of claim 10, wherein determining an input sample matrix by means of a first preset calculation model based on the neighbouring reference sample set and the preset parameter value comprises:
   determining an input reference sample set based on the neighbouring reference sample set and the preset parameter;
   determining an input sample matrix by means of a first preset calculation model based on thee input reference sample set.

12. The method of claim 10, wherein determining the neighbouring reference sample set of the current block comprises:
   acquiring a reference sample neighbouring to at least one side of the current block, the at least one side of the current block comprising at least one of a top side, a top-right side, a left side, or a bottom-left side; and
   determining the neighbouring reference sample set of the current block according to the acquired reference sample, comprising:
      performing first filtering processing on the reference sample neighbouring to the at least one side f the current block to determine the reference sample neighbouring to the at least one side; and
      forming the neighbouring reference sample set of the current block according to the acquired reference sample,
   wherein the first filtering processing comprises down-sampling filtering or low-pass filtering.

13. The method of claim 11, wherein determining the input reference sample set based on the neighbouring reference sample set and the preset parameter value comprises:
   buffering the neighbouring reference sample set to obtain an initial input reference sample set; and
   buffering the preset parameter value by using a data unit after the initial input reference sample set to obtain the input reference sample set.

14. The method of claim 13, wherein buffering the neighbouring reference sample set to obtain the initial input reference sample set comprises:
   parsing a bitstream to obtain a value of a transposition processing indication flag;
   when the value of the transposition processing indication flag is equal to 0, storing a reference sample in a buffer such that a reference sample corresponding to a top side of the current block in the neighbouring reference sample set is stored ahead of a reference sample corresponding to a left side of the current block in the neighbouring reference sample set, and determining the buffer as the initial input reference sample set; or
   when the value of the transposition processing indication flag is equal to 1, storing reference samples in the buffer such that the reference sample corresponding to the top side of the current block in the neighbouring reference sample set is stored after the reference sample corresponding to the left side of the current block in the neighbouring reference sample set, performing transposition processing on the buffer, and determining the transposed buffer as the initial input reference sample set.

15. The method of claim 11, wherein determining the input sample matrix by means of the first preset calculation model based on the input reference sample set comprises:
   calculating an $i^{th}$ input sample by means of the first preset calculation model according to a sample corresponding to a $(i+1)^{th}$ position and a sample corresponding to a $0^{th}$ position in the input reference sample set, comprising:
      performing a subtraction operation by means of the first preset calculation model, to obtain the $i^{th}$ input sample, wherein a minuend of the subtraction operation is set to be equal to the sample corresponding to the $(i+1)^{th}$ position in the input reference sample set, and a subtraction of the subtraction operation is set to be equal to the sample corresponding to the $0^{th}$ position in the input reference sample set, wherein i is a positive integer greater than or equal to 0 and less than N, N representing a number of elements contained in the input sample matrix; and
   forming the input sample matrix according to N input samples obtained by calculation.

16. The method of claim 10, wherein performing colour component prediction on the current block according to the input sample matrix to obtain the prediction block of the current block comprises:
   obtaining a Matrix-based Intra Prediction (MIP) block of the current block according to the input sample matrix, comprising: acquiring a weight matrix, a shift factor, and an offset factor corresponding to the current block; and performing matrix multiplication processing on the input sample matrix, the weight matrix, the shift factor, and the offset factor by means of a second preset calculation model to calculate the MIP block, and performing clipping processing on the predicted sample in the MIP block to obtain the MIP block of the current block, wherein the MIP block comprises a predicted sample in at least part of sample positions in the current block;
   when one of a width and a height of the MIP block is different from that of the current block, performing second filtering processing on the MIP block to obtain the prediction block of the current block; or
   when both of the width and the height of the MIP block are the same as those of the current block, setting the prediction block of the current block to be equal to the MIP block, wherein the prediction block contains a predicted sample at all sample positions in the current block.

17. The method of claim 16, wherein obtaining the MIP block of the current block according to the input sample matrix comprises:
   parsing a bitstream to obtain a value of a transposition processing indication flag;

judging, according to the value of the transposition processing, whether to perform transposition processing on the MIP block; and when a judgment result is "yes", performing transposition processing on the predicted sample in the MIP block, and determining the transposed MIP block as the MIP block of the current block.

18. The method of claim 16, wherein the second filtering processing comprises up-sampling filtering or low-pass filtering, wherein when the second filtering processing refers to the up-sampling filtering, the method further comprises:

determining a horizontal up-sampling factor and a vertical up-sampling factor corresponding to the current block; and determining, according to the MIP block, the horizontal up-sampling factor and the vertical up-sampling factor, a predicted value of a to-be-filled sample position in the current block by means of a third preset calculation model, to obtain the prediction block of the current block, wherein the to-be-filled sample position is a sample position in the current block different from a sample position in the MIP block.

19. An encoder, comprising a first memory and a first processor, wherein the first memory is configured to store a computer program capable of running in the first processor; and the first processor is configured to run the computer program to execute a method for colour component prediction, the method comprising:

determining a neighbouring reference sample set of a current block, wherein the neighbouring reference sample set comprises at least one reference sample;

determining a preset parameter value corresponding to the current block, comprising:

determining a bitdepth value corresponding to a to-be-predicted colour component of the current block; and performing a shift on 1 by the bitdepth value minus 1 to obtain the preset parameter value;

determining an input sample matrix by means of a first preset calculation model based on the neighbouring reference sample set and the preset parameter value; and performing colour component prediction on the current block according to the input sample matrix to obtain a prediction block of the current block.

20. The encoder of claim 19, wherein determining an input sample matrix by means of a first preset calculation model based on the neighbouring reference sample set and the preset parameter value comprises:

determining an input reference sample set based on the neighbouring reference sample set and the preset parameter;

determining an input sample matrix by means of a first preset calculation model based on the input reference sample set.

21. The encoder of claim 20, wherein determining the input sample matrix by means of the first preset calculation model based on the input reference sample set comprises:

performing, according to a sample corresponding to a $(i+1)^{th}$ position and a sample corresponding to a $0^{th}$ position in the input reference sample set, a subtraction operation by means of the first preset calculation model, to obtain an $i^{th}$ input sample, wherein a minuend of the subtraction operation is set to be equal to the sample corresponding to the $(i+1)^{th}$ position in the input reference sample set; and a subtraction of the subtraction operation is set to be equal to the sample corresponding to the $0^{th}$ position in the input reference sample set, and wherein i is a positive integer greater than or equal to 0 and less than N, N representing a number of elements contained in the input sample matrix; and forming the input sample matrix according to N input samples obtained by calculation.

22. A decoder, comprising a second memory and a second processor, wherein the second memory is configured to store a computer program capable of running in the second processor; and the second processor is configured to run the computer program to execute a method for colour component prediction, comprising:

determining a neighbouring reference sample set of a current block, wherein the neighbouring reference sample set comprises at least one reference sample;

determining a preset parameter value corresponding to the current block, comprising:

determining a bitdepth value corresponding to a to-be-predicted colour component of the current block; and performing a shift on 1 by the bitdepth value minus 1 to obtain the preset parameter value;

determining an input sample matrix by means of a first preset calculation model based on the neighbouring reference sample set and the preset parameter value; and performing colour component prediction on the current block according to the input sample matrix to obtain a prediction block of the current block.

23. The decoder of claim 22, wherein determining an input sample matrix by means of a first preset calculation model based on the neighbouring reference sample set and the preset parameter value comprises:

determining an input reference sample set based on the neighbouring reference sample set and the preset parameter;

determining an input sample matrix by means of a first preset calculation model based on thee input reference sample set.

24. The decoder of claim 23, wherein determining the input sample matrix by means of the first preset calculation model based on the neighbouring reference sample set and the preset parameter value comprises:

calculating an $i^{th}$ input sample by means of the first preset calculation model according to a sample corresponding to a $(i+1)^{th}$ position and a sample corresponding to a $0^{th}$ position in the input reference sample set, comprising:

performing a subtraction operation by means of the first preset calculation model, to obtain the $i^{th}$ input sample, wherein a minuend of the subtraction operation is set to be equal to the sample corresponding to the $(i+1)^{th}$ position in the input reference sample set, and a subtraction of the subtraction operation is set to be equal to the sample corresponding to the $0^{th}$ position in the input reference sample set, wherein i is a positive integer greater than or equal to 0 and less than N, N representing a number of elements contained in the input sample matrix: and forming the input sample matrix according to N input samples obtained by calculation.

* * * * *